US011193768B2

(12) United States Patent
Blomqvist et al.

(10) Patent No.: US 11,193,768 B2
(45) Date of Patent: Dec. 7, 2021

(54) GYROSCOPE WITH DOUBLE INPUT

(71) Applicant: MURATA MANUFACTURING CO., LTD., Nagaokakyo (JP)

(72) Inventors: Anssi Blomqvist, Helsinki (FI); Ville-Pekka Rytkönen, Klaukkala (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 20 days.

(21) Appl. No.: 16/783,726

(22) Filed: Feb. 6, 2020

(65) Prior Publication Data

US 2020/0263989 A1      Aug. 20, 2020

(30) Foreign Application Priority Data

Feb. 15, 2019 (FI) .................................... 20195117
Jun. 28, 2019 (FI) .................................... 20195584

(51) Int. Cl.
*G01C 19/5712* (2012.01)

(52) U.S. Cl.
CPC ................................ *G01C 19/5712* (2013.01)

(58) Field of Classification Search
CPC .......................... G01C 19/575; G01C 19/5712
See application file for complete search history.

(56) References Cited

U.S. PATENT DOCUMENTS

| 6,725,719 B2 | 4/2004 | Cardarelli |
| 2004/0211258 A1 | 10/2004 | Geen |
| 2005/0056094 A1 | 3/2005 | Geen |
| 2010/0116050 A1 | 5/2010 | Wolfram |
| 2010/0313657 A1 | 12/2010 | Trusov et al. |
| 2011/0023600 A1 | 2/2011 | Wrede et al. |
| 2011/0030474 A1 | 2/2011 | Kuang et al. |
| 2011/0252886 A1 | 10/2011 | Asano et al. |

(Continued)

FOREIGN PATENT DOCUMENTS

| JP | 2000-009475 A | 1/2000 |
| JP | 2006-525511 A | 11/2006 |

(Continued)

OTHER PUBLICATIONS

Finnish Search Report dated Jan. 20, 2020 corresponding to Finnish Patent Application No. 20195584.

(Continued)

*Primary Examiner* — David J Bolduc
(74) *Attorney, Agent, or Firm* — Squire Patton Boggs (US) LLP

(57) ABSTRACT

A MEMS gyroscope comprises a first resonator with one or more first Coriolis element pairs, and a second resonator with one or more second Coriolis element pairs. The primary oscillation of these resonators is driven with the same drive signal, and a coupling arrangement between the first and second resonators synchronizes the primary oscillation of the one or more first Coriolis element pairs with the primary oscillation of the one or more second Coriolis element pairs. The coupling arrangement does not synchronize the secondary oscillation of the one or more first Coriolis element pairs with the secondary oscillation of the one or more second Coriolis element pairs. The secondary oscillations of the first and second electromechanical resonators are therefore independent of each other.

8 Claims, 12 Drawing Sheets

(56) References Cited

U.S. PATENT DOCUMENTS

| | | | |
|---|---|---|---|
| 2012/0048017 A1 | 3/2012 | Kempe | |
| 2013/0233048 A1* | 9/2013 | Anae | G01C 25/00 |
| | | | 73/1.77 |
| 2013/0283908 A1* | 10/2013 | Geen | G01C 19/5719 |
| | | | 73/504.12 |
| 2014/0224016 A1* | 8/2014 | Leclerc | G01C 19/5712 |
| | | | 73/504.12 |
| 2014/0230549 A1* | 8/2014 | McNeil | G01C 19/5684 |
| | | | 73/504.13 |
| 2015/0330783 A1 | 11/2015 | Rocchi et al. | |
| 2018/0058853 A1 | 3/2018 | Jia et al. | |
| 2018/0172446 A1 | 6/2018 | Prikhodko et al. | |
| 2018/0266822 A1* | 9/2018 | Giner | G01C 19/574 |
| 2019/0346265 A1* | 11/2019 | Kuisma | G01C 19/574 |
| 2020/0200534 A1* | 6/2020 | Kuisma | G01C 19/5684 |
| 2020/0200535 A1* | 6/2020 | Kuisma | G01C 19/5712 |
| 2020/0263987 A1* | 8/2020 | Blomqvist | G01C 19/5712 |
| 2020/0263988 A1* | 8/2020 | Blomqvist | G01C 19/5712 |

FOREIGN PATENT DOCUMENTS

| | | |
|---|---|---|
| JP | 2010-107326 A | 5/2010 |
| JP | 2013-501241 A | 1/2013 |

OTHER PUBLICATIONS

European Search Report dated Jun. 15, 2020 corresponding to European Patent Application No. 20155335.

* cited by examiner

GYROSCOPE WITH DOUBLE INPUT

FIELD OF THE DISCLOSURE

This disclosure relates to microelectromechanical gyroscopes, and more particularly to single-axis and multiaxis gyroscopes where a rotation rate is measured about one or more input axes.

BACKGROUND OF THE DISCLOSURE

Microelectromechanical (MEMS) gyroscopes may contain one or more oscillating electromechanical resonators. Each electromechanical resonator may contain one or more oscillating Coriolis elements. These elements are typically suspended from a fixed structure by flexible suspenders which allow the Coriolis elements to be driven into a primary oscillation mode (which may also be called the drive oscillation mode) by drive transducers and to be easily set into a secondary oscillation mode (which may also be called the sense oscillation mode) by the Coriolis force when the gyroscope undergoes angular rotation.

Some MEMS gyroscopes are designed for measuring rotation rate about one measurement axis which is perpendicular to the device substrate. Such gyroscopes may be called z-axis gyroscopes. Other MEMS gyroscopes are designed for measuring rotation rate about either of the two perpendicular measurement axes which lie in the substrate plane. Such gyroscopes may be called x-axis gyroscopes and/or y-axis gyroscopes. The measurement axis of a gyroscope may also be called its input axis. Multiaxis gyroscope are designed to simultaneously measure rotation rates about more than one measurement axis.

A simple MEMS gyroscope may be constructed utilizing only one oscillating Coriolis element, but its output signal will typically be very noisy in the presence of external vibrations, particularly if those vibrations have frequencies close to the oscillating frequency of the gyroscope. It is known that a system where two or four Coriolis elements oscillate in anti-phase can be made much more robust against external disturbances because signal components arising from vibrations that induce cophasal movement can to some degree be automatically cancelled via differential measurements.

Low noise and high stability are nevertheless very important criteria in many applications where high-performance gyroscopes are used. However, even in designs where multiple Coriolis elements are measured differentially, measurements errors and noise cannot in practice be reduced to zero. Limitations in manufacturing processes introduce another element of uncertainty into practical gyroscope implementations, and it cannot be taken for granted that the performance of a gyroscope will always remain precisely constant over time, especially in changing environmental conditions.

It is for these reasons common practice in many applications to use two separate gyroscopes for measuring angular rotation about the same input axis (which may be the z-axis, x-axis or y-axis). The data provided by an additional gyroscope performing the same measurement on the same circuit board can reduce some measurement uncertainties by improving the possibility of detecting component failure in one of the gyroscopes or drift in its output signal.

Document U.S. Pat. No. 6,725,719 discloses MEMS devices containing multiple gyroscopes for measuring angular rotation about the same input axis. A problem with implementing multiple gyroscopes on the same circuit substrate is that they consume a lot of space and typically also require separate control electronics. Furthermore, each separate gyroscope and associated electronics form a closed system with the same limitations that a single gyroscope would have. Using multiple gyroscopes for the same axis typically improves measurement accuracy only by increasing the number of observations (which reduces the standard error).

BRIEF DESCRIPTION OF THE DISCLOSURE

An objective of the present disclosure is to provide an apparatus for overcoming the above problems.

The objective of the disclosure is achieved by an arrangement which is characterized by what is stated in the independent claim. The preferred embodiments of the disclosure are disclosed in the dependent claims.

The disclosure is based on the idea of forming in one device substrate two adjacent gyroscopes with the same input axis and with a common drive mechanism for generating a primary oscillation mode. Each of the two gyroscopes is in itself robust against external error sources, like e.g. vibration—that is, it comprises at least two Coriolis elements oscillating in anti-phase.

An advantage of the arrangement presented in this disclosure is that the two gyroscopes can be designed with an identical or e.g. mirror symmetrical layout and then manufactured with the same manufacturing process and on the same part of the same wafer since they are adjacent to each other in the wafer layout. Many common error sources due to e.g. manufacturing tolerances can therefore be eliminated already in the design process.

The primary oscillation of the two gyroscopes can be synchronized with high precision by device design, i.e. utilizing a selection from a multitude of prior art drive coupling techniques, which allows common drifts in their output to be compensated in a differential measurement. Alternatively, the two gyroscopes can be sensitized to different measurement ranges, so that one of them measures rotation about the input axis with a small signal range and low noise, while the other measures the same variable with more noise but with a larger signal range. The two gyroscopes can share the same control electronics, which allows a self-test function to be easily implemented by comparing the two outputs.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Figure 1A:
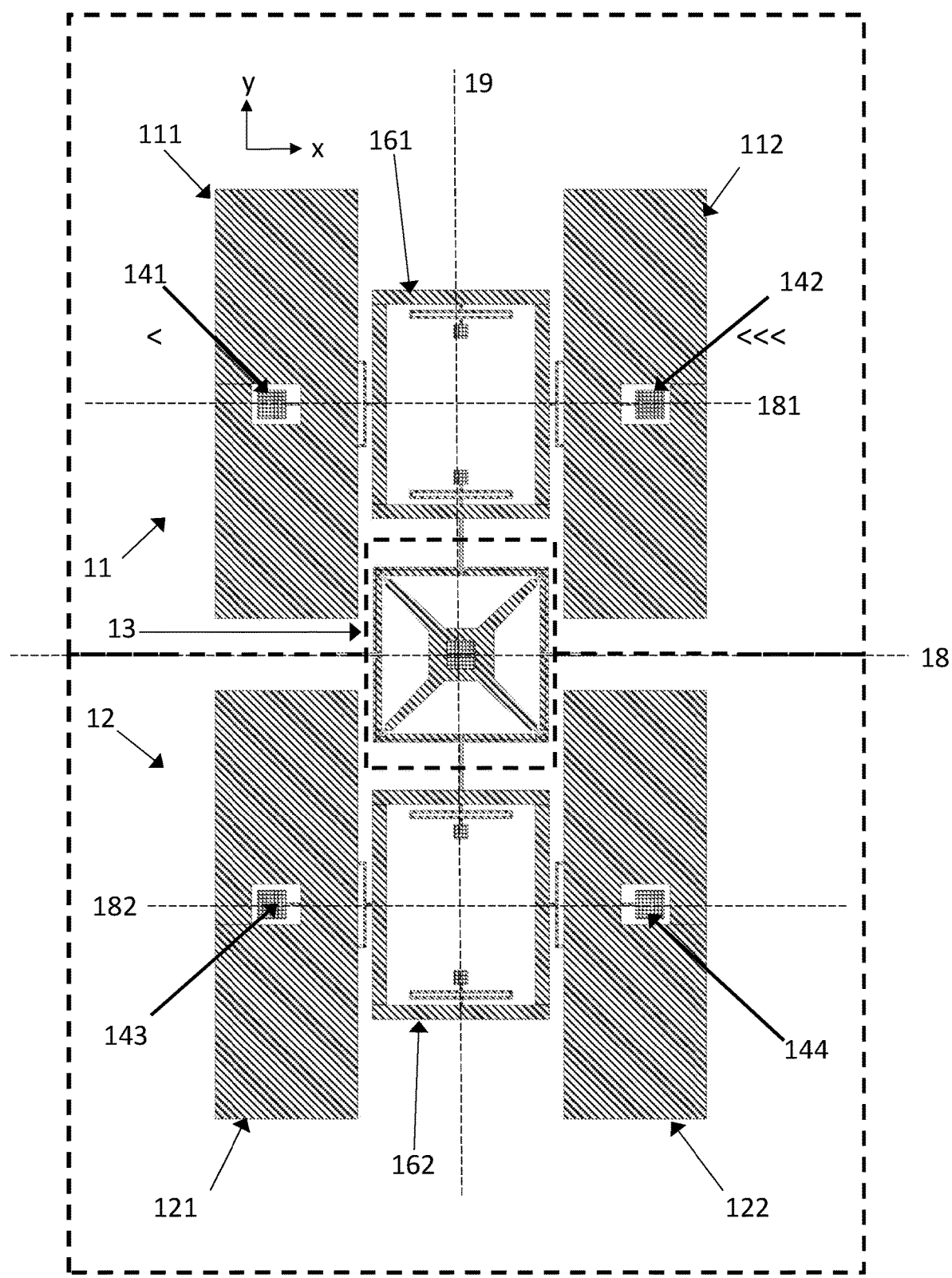
FIGS. 1a-1c illustrate a Y-axis gyroscope with a common anti-phase primary oscillation mode.

In order to maintain clarity, this disclosure will refer to the "two gyroscopes" of the preceding paragraphs as two "resonators": a first electromechanical resonator and a second electromechanical resonator. The term "gyroscope" will below refer only to the device as a whole, comprising two or more resonators, not to any single resonator. In other words, even though either of the first and second electromechanical resonators could be used on its own to measure the rotation rate about the input axis, only the combined system where both of these resonators are included will in this disclosure be referred to as a "gyroscope".

In this disclosure the device plane is illustrated and referred to as the xy-plane. The z-axis is perpendicular to the xy-plane. Linear and/or rotational motion (or a combination thereof) where the proof mass remains level in the device plane is referred to as "in-plane" motion or "motion in the device plane", while linear and/or rotational motion (or a combination thereof) where the proof mass (or its center of gravity) moves in a vertical direction may be referred to as "out-of-plane" motion, or "motion out of the device plane".

In this disclosure, "radial" oscillation refers to linear movement in the xy-plane, away from a central point and towards a central point. "Tangential" oscillation refers to movement in the xy-plane along the tangent or perimeter of an imaginary circle centred at a central point. Tangential oscillation may in practice be a mixture of linear movement and rotation. The suspension arrangement will determine how the proof masses move tangentially.

In the figures of this disclosure which depict the xy-plane, the placement of the Coriolis elements in the first and second electromechanical resonators correspond to their rest positions.

In this disclosure, rotation about any axis parallel to the vertical z-axis will be referred to simply as rotation about the z-axis. When this angular rotation rate is the measured variable, the input axis is the z-axis. Similarly, rotation about any axis parallel to the x-axis will be referred to as rotation about the x-axis, and rotation about any axis parallel to the y-axis will be referred to as rotation about the y-axis. When these angular rotation rates are measured, the input axes are the x-axis and y-axis, respectively. The input axis of the gyroscope can always be equated with the x-, y- or z-axis because the rotation rate of the component is independent of its distance from the true rotational axis of the movement which it is measuring.

Throughout this disclosure, the term "synchronize" in phrases such as "structure A synchronizes oscillation mode $X_1$ and oscillation mode $X_2$ into a common oscillation mode X", have the following meaning. Structure A constitutes a mechanical connection between a first set $S_1$ of interconnected mass elements and a second set $S_2$ of interconnected mass elements. These sets oscillate separately in oscillation mode $X_1$ and oscillation mode $X_2$ if they are not mechanically coupled to each other.

However, the first set and second set should preferably oscillate in a desired common mode X, and for this reason they are interconnected by structure A. While structure A enables the desired common mode X, it also raises the possibility that an undesired common oscillation mode Y may emerge. There may be many undesired oscillation modes Y, but the one with the lowest resonance frequency is typically of most interest. Structure A is a synchronizing structure if it exhibits a combination of rigidity and flexibility which couples the sets $S_1$ and $S_2$ into the desired common oscillation mode X by flexibly accommodating this common oscillation mode X, while simultaneously resisting the undesired common oscillation mode Y.

The relationship between the resonance frequency $F_X$ of the desired common mode X and the resonance frequencies $F_Y$ of the undesired common oscillation modes is more favourable with synchronization than with a standard, non-synchronizing coupling. In other words, structure A is typically rigid in the movement which the undesired oscillation mode Y would require. This raises the resonance frequency $F_Y$. The resonance frequency $F_X$ or may also be raised by structure A (compared to standard, non-synchronizing coupling). However, the flexible and rigid properties of structure A are such that the increase in $F_Y$ is significantly larger than the (possible) increase in the frequency $F_X$.

The presence of structure A thereby increases the ratio $F_Y/F_X$ and/or increases the difference $F_Y$-$F_X$. The reference state against which this improvement is measured may in some cases be the same system of interconnected mass elements without structure A. In this case the mass elements are interconnected by other structures as well, and structure A is purely a synchronization structure. In other cases, for example when structure A is also needed for supporting the weight of the mass elements, the reference state against which the synchronization improvement is measured may be the same system of mass elements where A has been replaced with an alternative, standard structure B which, for example, only gives structural support.

Correspondingly, the expression "does not synchronize", and phrases such as "structure A does not synchronize oscillation mode $X_1$ and oscillation mode $X_2$ into a common oscillation mode", mean that, although structure A forms a mechanical connection between $S_1$ and $S_2$, structure A exhibits a combination of rigidity and flexibility which does not couple the sets $S_1$ and $S_2$ into any common oscillation mode X. The two sets of interconnected mass elements $S_1$ and $S_2$ instead oscillate independently of each other. Structure A may, for example, remain so rigid during resonance oscillation that the movement of set $S_1$ influences the movement of set $S_2$ very little or not at all. Alternatively, structure A may be so flexible that little or no coupling occurs between the two sets. Examples of these two situations will be given below.

The devices described in this disclosure comprise one or more first Coriolis element pairs and one or more second Coriolis element pairs. The primary oscillation of these Coriolis element pairs is driven with the same drive signal. Two resonance modes predominate in drive oscillation: a common in-phase mode and a common anti-phase mode, as described in more detail below. One of these is the desired common drive mode X and the other is the undesired common drive mode Y. The coupling arrangement between the first and second electromechanical resonators synchronizes the drive oscillation of the first resonator with the drive oscillation of the second resonator by accommodating or promoting the desired common drive mode X, while resisting the undesired common drive mode Y.

A common anti-phase mode and a common in-phase mode also exists in the secondary oscillation mode the first and second electromechanical resonators, and they may exhibit these common modes when the gyroscope undergoes angular rotation. However, the coupling arrangement between the first and second electromechanical resonators does not promote either a common anti-phase mode, common in-phase mode, or any other phase relationship between the two resonators. The secondary oscillations of the first and second electromechanical resonators are independent of each other. The measurement results obtained from them can therefore be used for differential error compensation, noise optimization or self-test purposes.

In order for the coupling arrangement not to promote any particular phase relationship between the secondary oscillation of the one or more first Coriolis elements and the one or more second Coriolis elements, the coupling arrangement may consist of a drive synchronizing element which does not transmit the impact of the secondary oscillation mode in the first resonator to the second resonator, or vice versa.

At least in the x- and y-axis embodiments presented in this disclosure, this lack of transmission in the secondary oscillation may be achieved by connecting the coupling arrangement stiffly to a surrounding fixed structure, such as the device substrate, with respect to the secondary oscillation mode. In other words, the coupling arrangement may be suspended from the fixed structure in a manner which resists the movement which the Coriolis force will induce in the Coriolis elements. The coupling arrangement can nevertheless promote the desired common primary oscillation mode due to the action of the drive transducers and the mobility of the coupling arrangement with respect to the primary oscillation mode. In other words, the coupling arrangement may be suspended flexibly from the fixed structure for the movement produced by the drive transducers, and the drive synchronization element in the coupling arrangement may synchronize the primary oscillation modes of the first and second resonators. The coupling arrangement may also optionally comprise other parts in addition to the drive synchronizing element, but no parts of the coupling arrangement synchronize the secondary oscillation of the one or more first Coriolis elements with the secondary oscillation of the one or more second Coriolis elements.

At least in the z-axis embodiment presented in this disclosure, the lack of transmission between the secondary oscillation modes may be achieved by utilizing a coupling arrangement which comprises of a drive synchronizing element which flexibly allows any phase relationship between the secondary oscillation of the one or more first Coriolis elements and the one or more second Coriolis elements. The coupling arrangement may, for example, be placed between the two resonators without being suspended from its own anchor point. Again, the coupling arrangement may optionally comprise other parts than the drive synchronizing element, but no parts of the coupling arrangement synchronize the secondary oscillation of the one or more first Coriolis elements with the secondary oscillation of the one or more second Coriolis elements.

This disclosure describes a microelectromechanical gyroscope comprising a device plane defined by a lateral axis and a transversal axis. The transversal axis is orthogonal to the lateral axis, and the gyroscope also comprises at least one input axis which is either parallel to the lateral axis, parallel to the transversal axis, or orthogonal to the device plane.

The gyroscope further comprises a first electromechanical resonator and a second electromechanical resonator with a corresponding first resonator center point and second resonator center point.

The first electromechanical resonator comprises one or more first Coriolis element pairs. Each first Coriolis element pair is arranged symmetrically in relation to the first resonator center point. The second electromechanical resonator comprises the same number of second Coriolis element pairs. Each second Coriolis element pair is arranged symmetrically in relation to the second resonator center point.

The size, shape and location of each of the one or more first Coriolis element pairs in relation to the first resonator center point are substantially equal to the size, shape, and location of the corresponding second Coriolis element pair in relation to the second resonator center point.

The gyroscope further comprises a control unit and one or more drive transducers. The control unit comprises a drive circuit which is configured to set the first and second electromechanical resonators into their respective primary oscillation modes by applying one or more drive signals to the one or more drive transducers. In the primary oscillation mode the one or more first Coriolis element pairs oscillate in anti-phase in relation to the first resonator center point and the one or more second Coriolis element pairs oscillate in anti-phase in relation to the second resonator center point.

The gyroscope further comprises two or more first sense transducers connected to the first electromechanical resonator and configured to produce a first sense signal from a secondary oscillation mode induced in the first electromechanical resonator by the Coriolis force when the gyroscope undergoes angular rotation about the input axis. The gyroscope further comprises two or more second sense transducers connected to the second electromechanical resonator and configured to produce a second sense signal from a secondary oscillation mode induced in the second electromechanical resonator by the Coriolis force when the gyroscope undergoes angular rotation about the input axis.

All first and second Coriolis element pairs are suspended from a fixed structure by at least partly flexible suspension arrangements which accommodate the primary oscillation mode of the first and second electromechanical resonators, the secondary oscillation mode induced in the first electromechanical resonator and the secondary oscillation mode induced in the second electromechanical resonator.

The first and second electromechanical resonators are mechanically coupled with a coupling arrangement which synchronizes the primary oscillation modes of the first and second electromechanical resonators into a common in-phase or anti-phase primary oscillation mode but does not synchronize the secondary oscillation modes of the first and second electromechanical resonators.

The size, shape and location of the one or more first Coriolis element pairs in relation to the first resonator center point corresponds to the size, shape and location of the one or more second Coriolis element pairs in relation to the second resonator center point. The first electromechanical resonator and the second electromechanical resonator are therefore substantially identical (though manufacturing tolerances may introduce small differences). The first electromechanical resonator and the second electromechanical resonator thereby also have the same input axis.

The input axis may be the x-axis or the y-axis in the xy-plane, or it may be the z-axis which is orthogonal to the xy-plane, as described in more detail below. In this disclosure, the term input axis refers specifically to a measurement axis for which a double measurement has been implemented. In the Y-axis and Z-axis embodiments presented below, the gyroscope only has one input axis, while in the XY-axis embodiment it has two input axes. It may in the Z-axis embodiment be possible to also use the same Coriolis elements for measuring angular rotation rate about the x-axis and/or the y-axis (without double measurement on either axis). Such additional measurements will not be discussed in detail.

Y-Axis Embodiment

FIG. 1a illustrates a gyroscope in the device plane, illustrated as the xy-plane. The gyroscope comprises a lateral axis 18 and a transversal axis 19. The y-axis is in this case the input axis, so transversal axis 19 is parallel to the input axis. The gyroscope also comprises a first electromechanical resonator 11, delimited by the upper square marked with a dashed line. A second electromechanical resonator 12 is delimited by the lower dashed square. A coupling arrangement 13, limited by the rectangle in the middle, joins the first electromechanical resonator 11 mechanically to the second electromechanical resonator.

The first electromechanical resonator 11 comprises a first Coriolis element 111 and a second Coriolis element 112 on opposite sides of the transversal axis 19. These elements form a first Coriolis element pair 111+112. This pair is symmetrically aligned on a first lateral axis 181, so that half of each Coriolis element 111/112 lies on one side of the axis, and the other half on the other side. The first Coriolis element 111 is suspended from a first anchor point 141 on the first lateral axis 181, and the second Coriolis element is suspended from a second anchor point 142 on the same axis. The suspensions, which are not illustrated in detail, allow Coriolis elements 111 and 112 to undergo rotational oscillation at least about a vertical axis and about the first lateral axis 181.

Similarly, the second electromechanical resonator 12 comprises a third Coriolis element 121 and a fourth Coriolis element 122 on opposite sides of the transversal axis 19. These elements form a second Coriolis element pair 121+122. This pair is symmetrically aligned on a second lateral axis 182. The third Coriolis element 121 is suspended from a third anchor point 143 on the second lateral axis 182, and the fourth Coriolis element 122 is suspended from a fourth anchor point 144 on the same axis. The suspensions allow the same movements in the second Coriolis element pair as in the first Coriolis element pair.

As seen in FIG. 1a, all of the Coriolis elements 111, 112, 121 and 122 have the same size and shape, and the pairs are located in the same positions in relation to their respective resonator center points.

All anchor points are parts of a fixed structure which surrounds the gyroscope. The first and the second Coriolis elements 111 and 112 are joined together by a first drive frame 161, and the third and fourth Coriolis elements 113 and 114 are correspondingly joined together by a second drive frame 162. Each drive frame is suspended from two anchor points on the transversal axis 19. The drive frames 161 and 162 are centered at the first and second resonator center points, which lie at the crossing points between the transversal axis 19 and their corresponding lateral axis 181 or 182.

The input axis is in this case the y-axis. The gyroscope comprises one or more drive transducers which have not been illustrated in FIG. 1a. The drive transducers may, for example, be capacitive transducers placed within one or both of the drive frames and mechanically connected to the drive frame(s) so that a drive signal applied to the transducers can generate an oscillating force which sets the drive frame(s) in oscillating motion. The one or more drive transducers may alternatively be piezoelectric transducers, and they may alternatively be placed somewhere outside of the first and second drive frames.

Figure 1B:
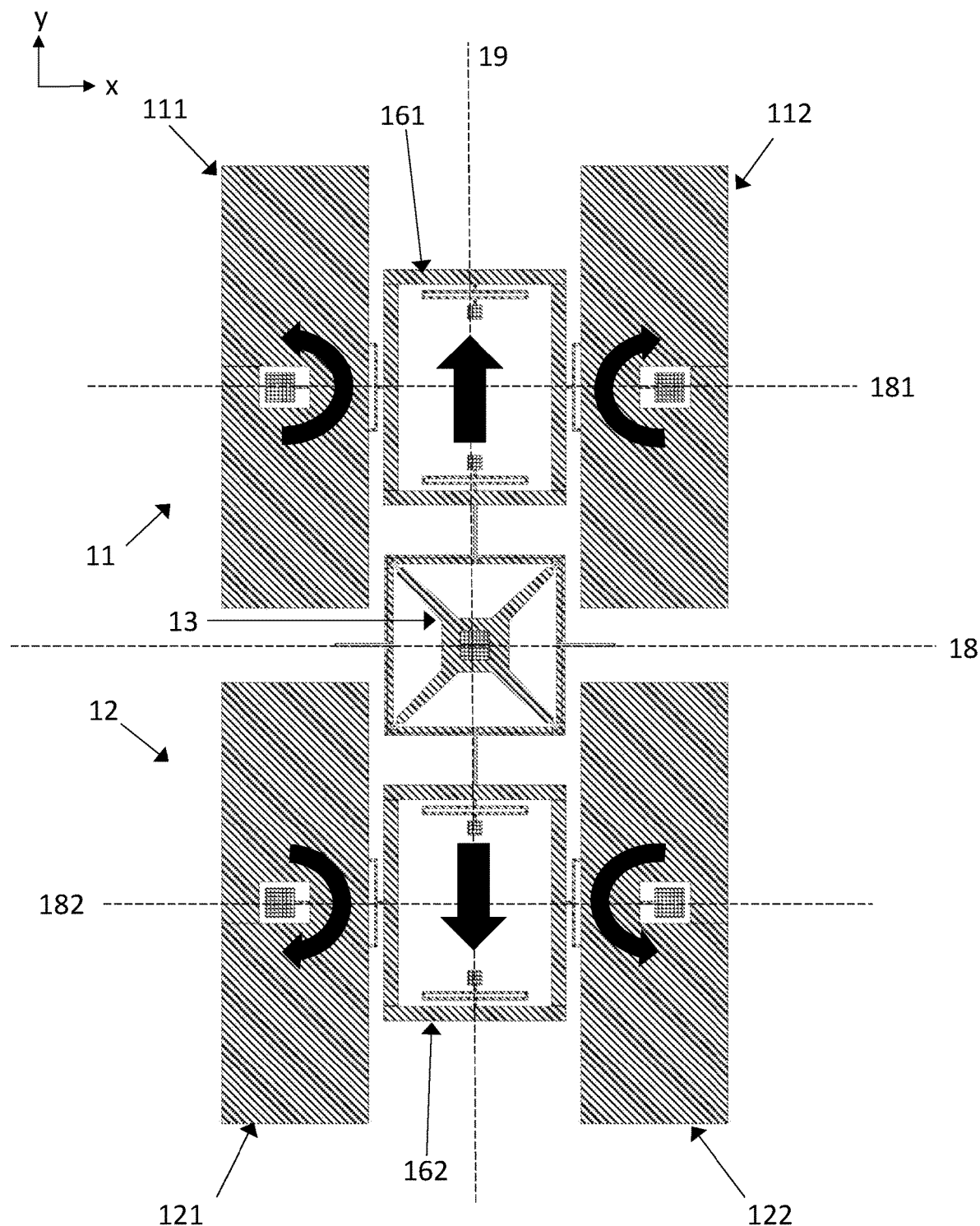

The drive transducers are configured to set the first and second drive frames 161 and 162 in linear oscillating motion along the transversal axis 19. This motion actuates the first and second Coriolis element pairs 111+112 and 121+122 into their primary oscillation mode. This is illustrated in FIG. 1b, where the motion induced by the drive transducers in the first and second drive frames 161 and 162 in one half of the primary oscillation cycle is indicated with black arrows within the frame. The corresponding rotational primary oscillation mode induced in the Coriolis element pairs is illustrated with black arrows on top of the Coriolis elements. In the second half of the oscillation cycle, the movement of each drive frame and Coriolis element is in the opposite direction.

Each Coriolis element is suspended from its anchor point by suspensions which prevent linear movement but allow rotational movement in relation to the anchor point. The linear motion of the drive frame 161 therefore induces a primary oscillation mode where the oscillation phase of the first Coriolis element 111 is opposite to the oscillation phase of the second Coriolis element 112. Element 111 rotates counter-clockwise when element 112 rotates clockwise, and vice versa. In other words, the first Coriolis element pair 111+112 oscillates in anti-phase in relation to the first resonator center point. Correspondingly, the second Coriolis element pair 121+122 oscillates in anti-phase in relation to the second resonator center point.

Coriolis elements 111 and 112 oscillate mirror-symmetrically in relation to the transversal axis 19, as seen in FIG. 1b. The corresponding relationship is obtained between Coriolis elements 121 and 122, which also oscillate mirror-symmetrically in relation to the same axis. The oscillation phase of the first Coriolis element 111 is the same as the oscillation phase of the fourth Coriolis element 122 (counter-clockwise). The oscillation phase of the second Coriolis element 112 is the same as that of the third Coriolis element 121 (clockwise).

The primary oscillation modes of the first and second electromechanical resonators are synchronized by the coupling arrangement 13 into a common anti-phase primary oscillation mode, where a clockwise movement in the first Coriolis element pair has a counter-clockwise counterpart in the second Coriolis element pair, and vice versa. The coupling arrangement comprises a drive synchronizing element 131 which couples the oscillation of the first drive frame 161 to the oscillation of the second drive frame 162 so that the desired common anti-phase relationship is obtained between the oscillation phases of the Coriolis elements. The operation of the drive synchronizing element 131 is described in more detail below with reference to FIGS. 4a and 4b.

Figure 1C:
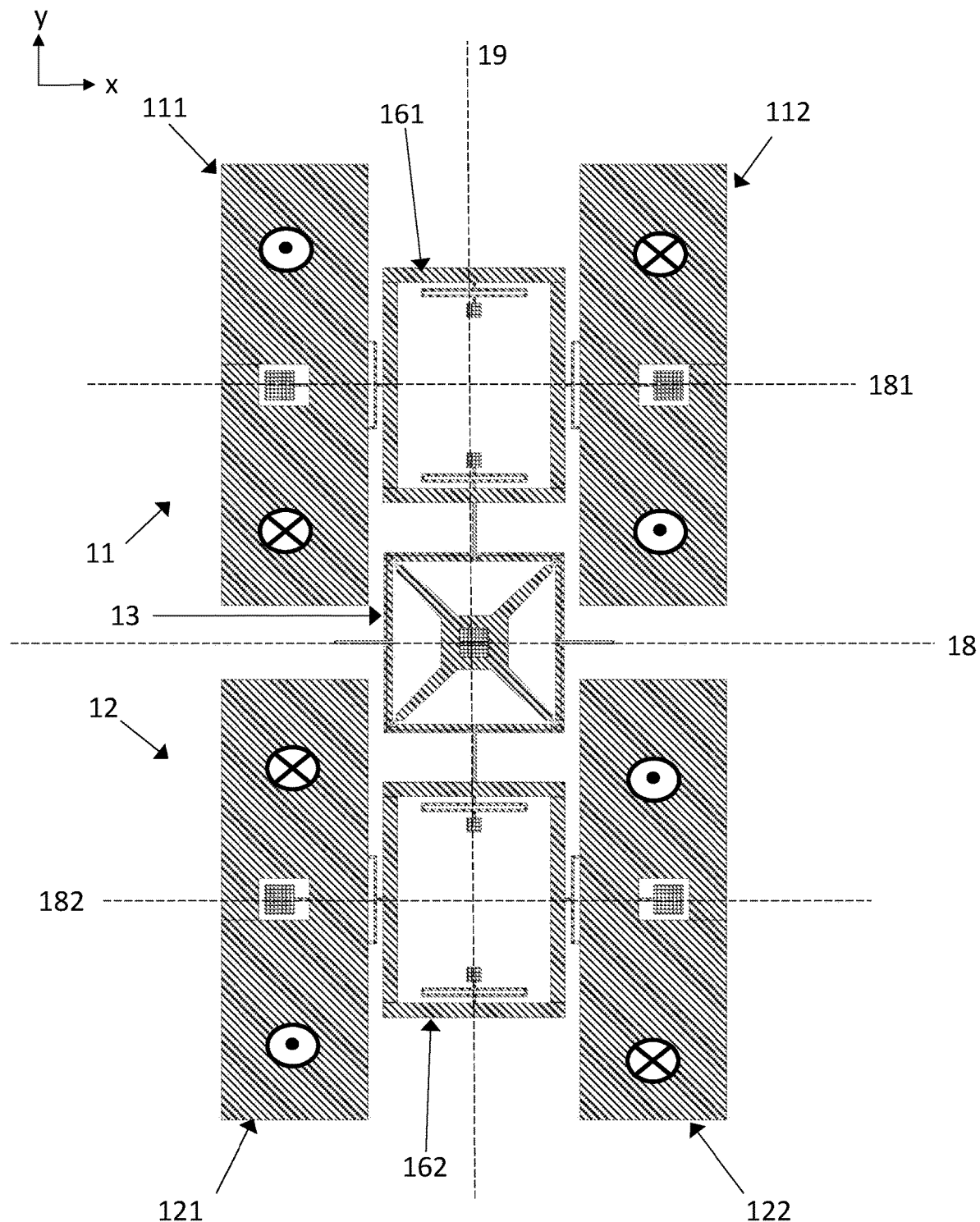

FIG. 1c illustrates the secondary oscillation modes of the first Coriolis element pair 111+112 and the second Coriolis element pair 121+122 when the gyroscope undergoes angular rotation about the input axis. Each Coriolis element oscillates rotationally about the corresponding lateral axis 181 or 182. The phase relationships in the secondary mode correspond to those of the primary mode. Cophasal primary oscillation will induce cophasal secondary oscillation, and anti-phase primary oscillation will induce anti-phase secondary oscillation. Cophasal oscillation is the same thing as in-phase oscillation.

The gyroscope comprises two or more first sense transducers for measuring the oscillation of the first Coriolis element 111 and the second Coriolis element 112, and two or more second sense transducers for measuring the oscillation of the third Coriolis element 121 and the fourth Coriolis element 122. These sense transducers may, for example, comprise capacitive parallel plates fixed to the Coriolis elements and to an adjacent fixed structure above and/or below the illustrated device plane. The two or more first sense transducers may be connected to a differential amplifier to produce a first sense signal where the effect of undesired common-mode vibration of the first and second Coriolis element has been cancelled. A second sense signal may be read from the two or more second sense transducers in the same manner.

In accordance with the above, in this embodiment the one or more first Coriolis element pairs comprise one first Coriolis element pair, and the one or more second Coriolis element pairs comprise one second Coriolis element pair. The primary oscillation mode of the first and second electromechanical resonators comprises rotational in-plane oscillation of each Coriolis element about a vertical axis which crosses said Coriolis element. The drive synchronizing element synchronizes a common anti-phase primary oscillation mode where the oscillation phase of the first Coriolis element pair with respect to the first resonator center point is anti-phase in relation to the oscillation phase of the second Coriolis element pair with respect to the second resonator center point.

In other words, the first Coriolis element oscillates in an anti-clockwise direction about its vertical axis when the second Coriolis element oscillates in a clockwise direction about its vertical axis, and vice versa. The third Coriolis element oscillates in a clockwise direction about its vertical axis when the fourth Coriolis element oscillates in an anti-clockwise direction about its vertical axis, and vice versa. The first Coriolis element oscillates in a clockwise direction about is vertical axis when the third Coriolis element oscillates in an anti-clockwise direction about its vertical axis, and vice versa. The input axis is parallel to the transversal axis 19.

Furthermore, the first Coriolis element 111 and the fourth Coriolis element 122 oscillate in the same phase because first Coriolis element 111 and fourth Coriolis element 122 turn clockwise/anti-clockwise about their respective vertical axes at the same time. Similarly, the second Coriolis element 112 and the third Coriolis element 121 also oscillate in the same phase, because 112 and 121 also turn clockwise/anti-clockwise at the same time. Finally, the first and third Coriolis elements 111 and 121 oscillate in the opposite phase because 111 turns clockwise when 121 turns anti-clockwise, and vice versa.

Figure 2A:
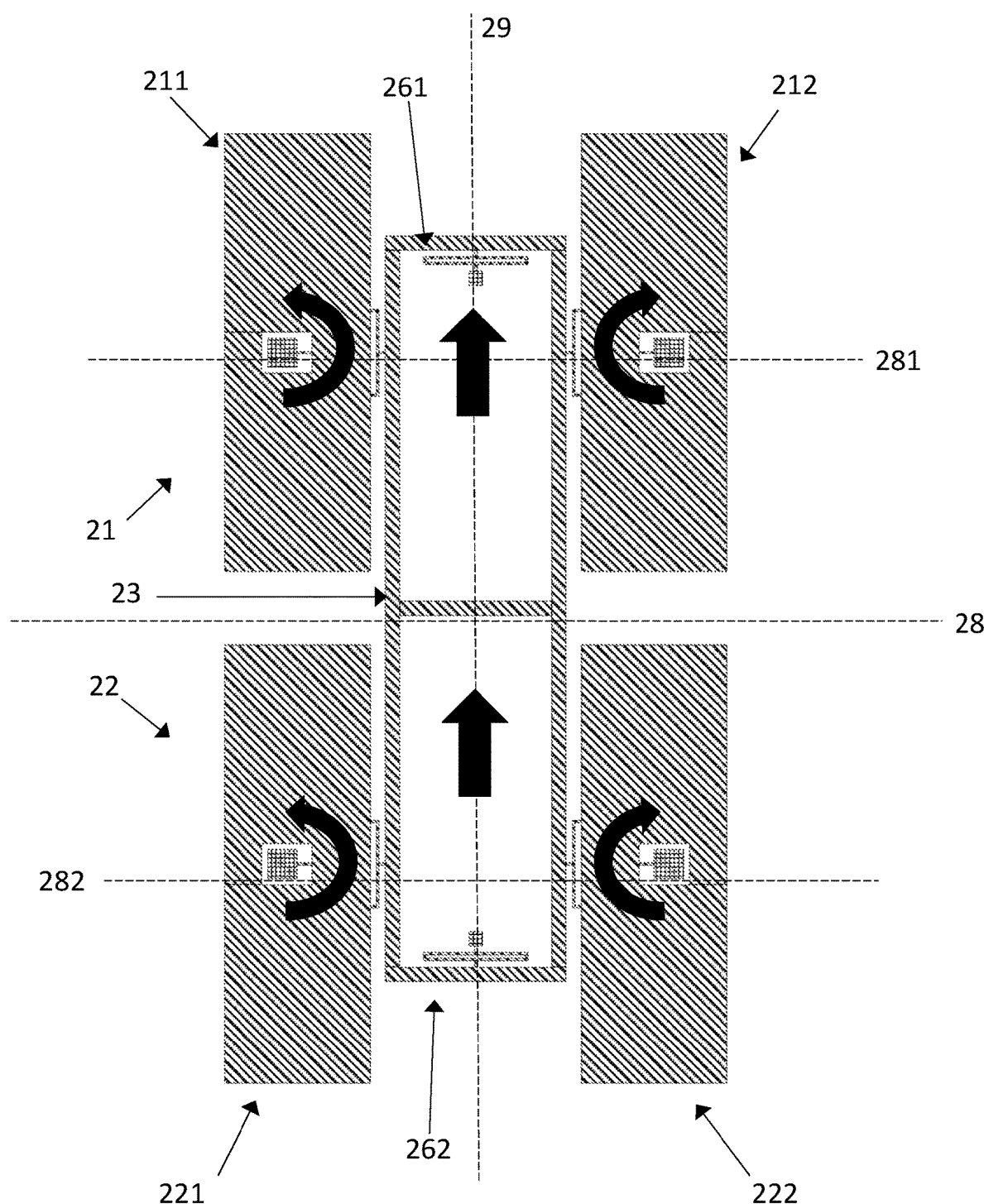
FIGS. 2a-2b illustrate a Y-axis gyroscope with a common in-phase primary oscillation mode.

FIG. 2a illustrates an alternative embodiment where the one or more first Coriolis element pairs comprise one first Coriolis element pair, and the one or more second Coriolis element pairs comprise one second Coriolis element pair, as in the previous embodiment illustrates in FIG. 1b. The primary oscillation mode of the first and second electromechanical resonators comprises rotational in-plane oscillation of each Coriolis element about a vertical axis which crosses said Coriolis element. This also corresponds to the previous embodiment. However, this alternative embodiment differs from the previous embodiment in that the drive synchronizing element 23 in this case synchronizes a common in-phase primary oscillation mode, where the oscillation phase of the first Coriolis element pair with respect to the first resonator center point is in-phase with the oscillation phase of the second Coriolis element pair with respect to the second resonator center point.

The drive transducers are in this case configured to set the drive synchronizing element 23 in linear oscillating motion along the transversal axis 29.

As illustrated in FIG. 2a, the first Coriolis element 211 oscillates in an anti-clockwise direction about its vertical axis when the second Coriolis element 212 oscillates in a clockwise direction about its vertical axis, and vice versa. Similarly, the third Coriolis element 221 oscillates in an anti-clockwise direction about its vertical axis when the fourth Coriolis element 222 oscillates in a clockwise direction about its vertical axis, and vice versa. But the first and third Coriolis elements oscillates simultaneously in a clockwise direction, and then anti-clockwise in the other half of the oscillation cycle.

So the first Coriolis element 211 and the third Coriolis element 221 now oscillate in the same phase because they turn clockwise/anti-clockwise simultaneously. Similarly, the second Coriolis element 212 and the fourth Coriolis element 222 also oscillate in the same phase because they turn clockwise/anti-clockwise simultaneously. Finally, the first and fourth Coriolis elements 211 and 222 oscillate in the opposite phase because 211 turns clockwise when 222 turns anti-clockwise, and vice versa.

The primary oscillation mode of the first electromechanical resonator is synchronized by synchronization frame 261, and the primary oscillation mode of the second electromechanical resonator by synchronization frame 262. In this case the primary oscillation modes of the first and second electromechanical resonators can be easily synchronized into a common in-phase primary oscillation mode by a rigid drive synchronizing element 23 which merely connects the first synchronization frame 261 to the second 262. A clockwise movement in the first Coriolis element pair then has a clockwise counterpart in the second Coriolis element pair, and vice versa. The back and forth movement of the drive synchronizing element 23 creates the desired common in-phase relationship between the first and second resonators. The drive synchronizing element 23, which here constitutes the coupling arrangement between the first and the second electromechanical resonator, may be a rigid body of any shape. However, it should have sufficient vertical thickness to prevent coupling between the secondary oscillation modes of the first and second electromechanical resonators. This also applies to the coupling arrangement illustrated in FIG. 1a.

Figure 2B:
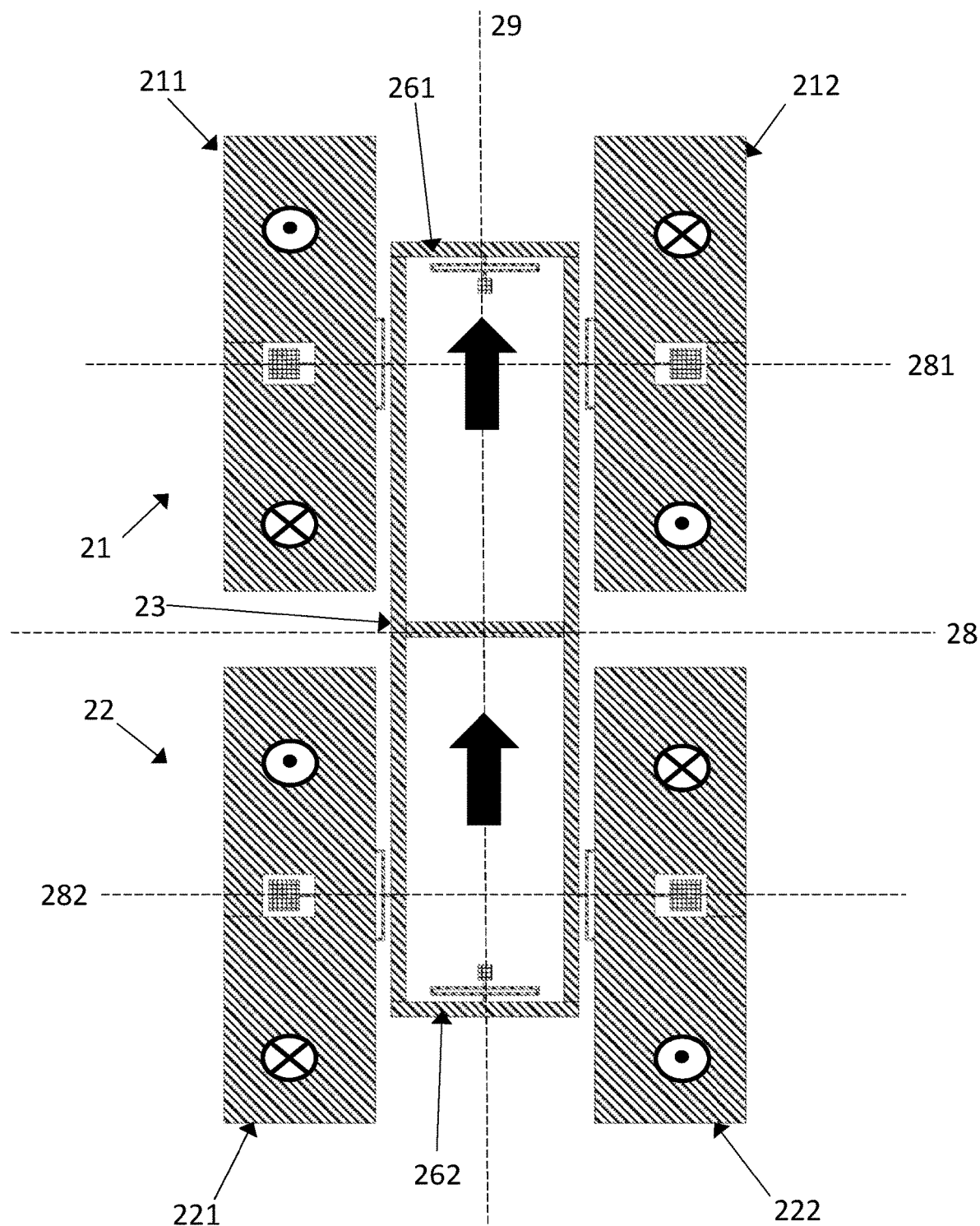

FIG. 2b illustrates the secondary oscillation modes of the first Coriolis element pair 211+212 and the second Coriolis element pair 221+222 when the gyroscope undergoes angular rotation about the input axis. In the secondary oscillation modes, each Coriolis element oscillates rotationally about the corresponding lateral axis 281 or 282. The phase relationships in the secondary modes correspond to those of the primary mode. Cophasal primary oscillation will induce cophasal secondary oscillation, and anti-phase primary oscillation will induce anti-phase secondary oscillation. As before, the gyroscope comprises two or more first sense transducers for measuring the oscillation of the first Coriolis element 211 and the second Coriolis element 212, and two or more second sense transducers for measuring the oscillation of the third Coriolis element 221 and the fourth Coriolis element 222. The two or more first sense transducers may be connected to a differential amplifier to produce a first sense signal where the effect of undesired common-mode vibration of the first and second Coriolis element has been cancelled. A second sense signal may be connected to the two or more second sense transducers in the same manner. Now the polarities of the two resonator signals can be configured to opposites by the order of the subtracted transducer signals.

In the y-axis embodiments illustrated above, the coupling arrangement consisted only of a drive synchronizing element which does not transmit the impact of the secondary oscillation mode in the first resonator to the second resonator, or vice versa. It only promotes the selected common primary oscillation mode and no additional structures which would synchronize the secondary oscillation. The coupling arrangement does not comprise any other elements which would connect the first resonator to the second resonator.

The secondary oscillation modes between resonators should not be synchronized by any part of the coupling arrangement. If, for example, the coupling arrangement would comprise some kind of spring which connects the lower end of first Coriolis element 111 to the upper element of third Coriolis element 121 in FIG. 1b, or the lower end of 112 to the upper end of 122, then those springs should be so flexible in the vertical direction that the secondary oscillation modes are not synchronized. Correspondingly, if the coupling arrangement would comprise a structure which connects the lower end of first Coriolis element 211 and the upper element of Coriolis element 221 in FIG. 2b, then that structure should not be capable of acting as a seesaw which synchronizes the secondary oscillation by turning about the lateral axis 28.

However, it may be beneficial for the vibration robustness of the sensor to couple the two transducers of the resonators to promote their anti-phase motion and reject their common-mode motion.

XY-Axis Embodiment

Figure 3:
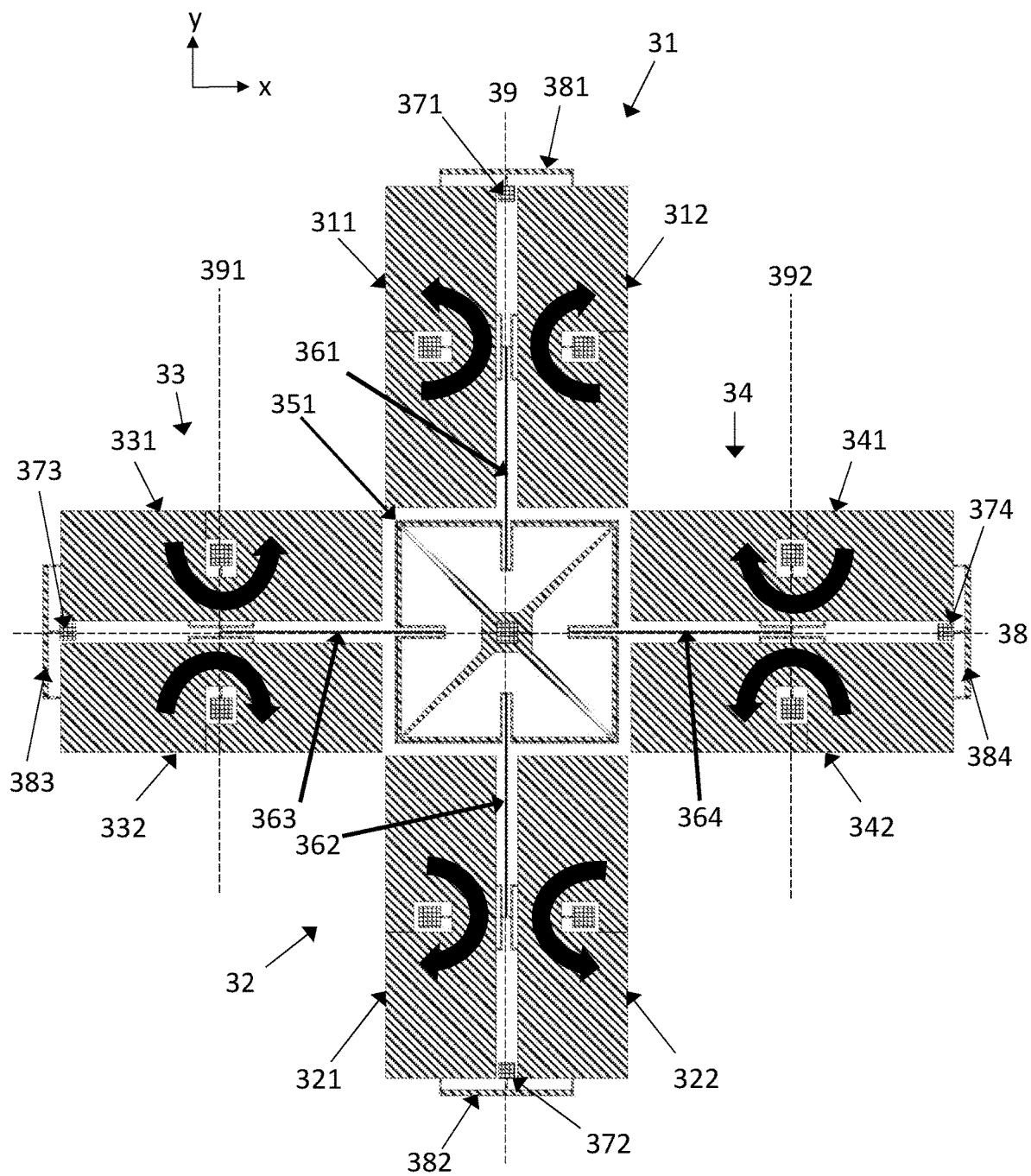
FIG. 3 illustrates a XY-axis gyroscope with a common anti-phase primary oscillation mode.

The two Y-axis embodiments presented in the previous section can be expanded into corresponding XY-axis embodiments with the following modifications. FIG. 3 illustrates a gyroscope in the device plane. The gyroscope comprises a lateral axis 38 and a transversal axis 39. In this case the gyroscope has two orthogonal input axes, one of which is parallel to the lateral axis 38 and the other of which is parallel to the transversal axis 39. The gyroscope also comprises a first electromechanical resonator 31, a second electromechanical resonator 32, a third electromechanical resonator 33 and a fourth electromechanical resonator 34. A coupling arrangement located inside the resonators and centered at a gyroscope center point where the lateral axis 38 crosses the transversal axis 39, joins these resonators together and synchronizes their drive oscillation in a manner which will be described below. The coupling arrangement comprises the central drive synchronization element 351 and synchronization bars 361-364.

The first electromechanical resonator 31 comprises a first Coriolis element 311 and a second Coriolis element 312 on opposite sides of the transversal axis 39 and the second electromechanical resonator 32 comprises a third Coriolis element 321 and a fourth Coriolis element 322 on opposite sides of the transversal axis 39. These elements form the first and second Coriolis element pairs and their primary and secondary oscillation take place in the same manner as in the Y-axis embodiment described above.

The third electromechanical resonator 33 comprises a fifth Coriolis element 331 and a sixth Coriolis element 332 on opposite sides of the lateral axis 38. Together, they form a third Coriolis element pair. The fourth electromechanical resonator 34 comprises a seventh Coriolis element 341 and an eighth Coriolis element 342 on opposite sides of the lateral axis 38. Together, they form a fourth Coriolis element pair.

Each Coriolis element may be suspended from an anchor point located within an opening in the Coriolis element, as in the previous embodiment. The third Coriolis element pair 331+332 is symmetrically aligned on a first transversal axis 391, and the fourth Coriolis element pair 341+342 is symmetrically aligned on a second transversal axis 392.

As before, all Coriolis elements 311-342 may have the same size and shape, and the pairs are located in corresponding positions in relation to their respective resonator center points.

The input axis for the third and fourth electromechanical resonators is the x-axis. The gyroscope comprises one or more drive transducers which have not been illustrated in FIG. 3. The drive transducers may comprise any of the drive transducers specified in the previous Y-axis embodiment, and similar transducers may be implemented also on the third and fourth Coriolis element pairs. The gyroscope comprises synchronization bars 361-364 which join each Coriolis element pair to a drive synchronization element 351.

The drive transducers are configured to set the third and fourth electromechanical resonators into rotational primary oscillation modes which correspond to the primary oscillation modes illustrated for the first and second electromechanical resonators in FIG. 1b. The induced primary mode of the Coriolis element pairs is illustrated with black arrows on top of the Coriolis elements. The oscillation phase of the fifth Coriolis element 331 will thereby be opposite to the phase of the sixth Coriolis element 332, and the oscillation phase of the seventh Coriolis element 341 will be opposite to the oscillation phase of the eighth Coriolis element 342. Furthermore, the drive synchronization element 351 will synchronize the primary oscillation modes so that the oscillation phase of the fifth Coriolis element 331 is opposite to that of the seventh Coriolis element 341, and the oscillation phase of the sixth Coriolis element 332 is opposite to that of the eighth Coriolis element 342.

In other words, the primary oscillation modes of the third and fourth electromechanical resonators are synchronized by the coupling arrangement into a common anti-phase primary oscillation mode. The phase relationships of the out-of-plane secondary oscillation modes of the third and fourth electromechanical resonators correspond to the relationships illustrated for the first and second electromechanical resonators in FIG. 1c.

In addition to the sense transducers which measure the oscillation of the first and second Coriolis element pairs, the gyroscope comprises two or more third sense transducers for measuring the oscillation of the fifth Coriolis element 331 and the sixth Coriolis element 332, and two or more fourth sense transducers for measuring the oscillation of the seventh Coriolis element 341 and the eighth Coriolis element 342. Third and fourth sense signals, both of which indicate the magnitude of angular rotation about the x-axis, can be read from these sense transducers.

Synchronization of Y-Axis and XY-Axis Embodiments

As mentioned before, the primary oscillation mode should preferably be synchronized within each Coriolis element pair so that the two Coriolis elements which form the pair oscillate in anti-phase. This can for example be achieved with the synchronization frames 161-162 discussed above. Furthermore, FIG. 3 also illustrates optional seesaw bars 381-384 which may be employed to synchronize the secondary oscillation of each Coriolis element pair. These seesaw bars provide internal synchronization within each resonator, but they do not provide any synchronization of secondary modes between the different resonators. Due to the synchronization of the primary (and optionally also the secondary) modes of each Coriolis element pair, each micromechanical resonator becomes a robust sensor of angular rotation rate.

The seesaw synchronization in FIG. 3 will first be discussed in more detail. An additional anchor point 371-374 is located between the two Coriolis elements which form a pair. Each seesaw bar 381-384 is attached to the corresponding additional anchor point 371-374 with a torsionally pliable attachment mechanism. Seesaw bars 381 and 382 can thereby rotate about the transversal axis 39, and seesaw bars 383 and 384 can rotate about the lateral axis 38, when the gyroscope undergoes angular rotation about the y-axis and the x-axis, respectively. The seesaw bars can thereby reject the common in-phase oscillation of each Coriolis element pair. The means of attachment between each Coriolis element and the corresponding seesaw bars should be sufficiently flexible for in-plane bending to allow rotational in-plane oscillation in the primary mode. The seesaw bars illustrated in FIG. 3 can also be employed for the same purpose in the Y-axis embodiment illustrated in FIGS. 1a-1c above.

The primary oscillation modes of the first and second Coriolis element pairs (and in the XY-axis embodiment, the primary modes of the third and fourth Coriolis element pairs) is synchronized with the drive synchronization element 131/351 which is located at the gyroscope center point where the lateral axis crosses the transversal axis. However, the drive synchronization element 131/351 should preferably not synchronize the secondary oscillation modes of the first and second (and third and fourth) Coriolis element pairs because the first and second (third and fourth) micromechanical resonators should be configured to perform independent measurements of angular rotation rate about their respective input axes.

The secondary oscillation movement of any particular Coriolis element in the first micromechanical resonator should therefore preferably not be transmitted to any Coriolis element in the second micromechanical resonator via the drive synchronization element 131/351. This objective can be satisfactorily achieved with many different synchronization elements, because the amplitude of the secondary oscillation mode is typically small.

Figure 4A:
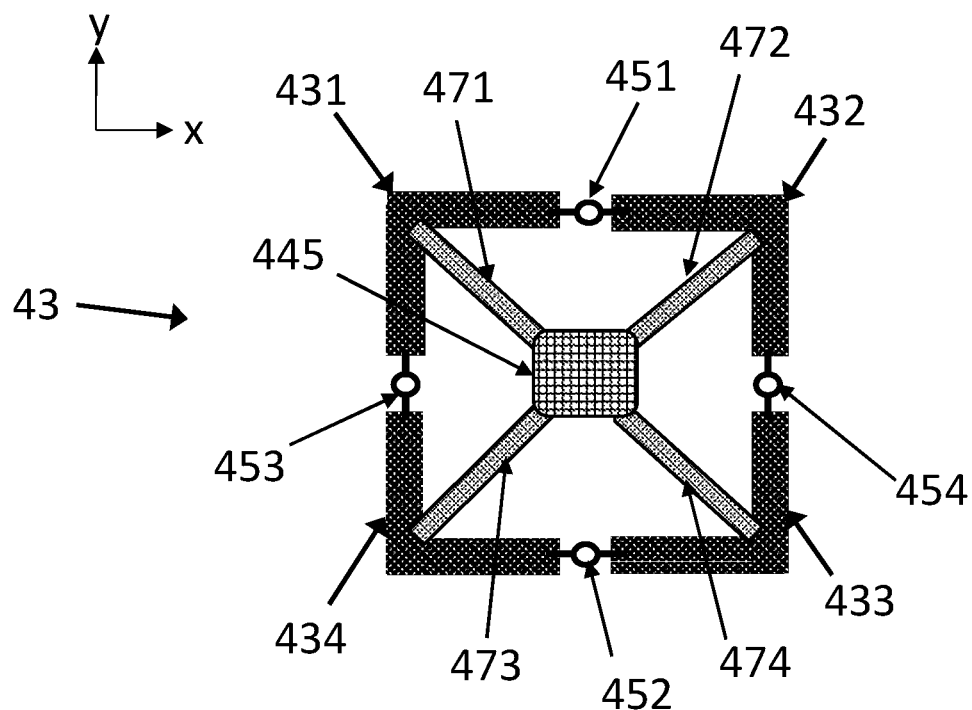
FIGS. 4a-4b illustrate a central synchronization element.
Figure 4B:
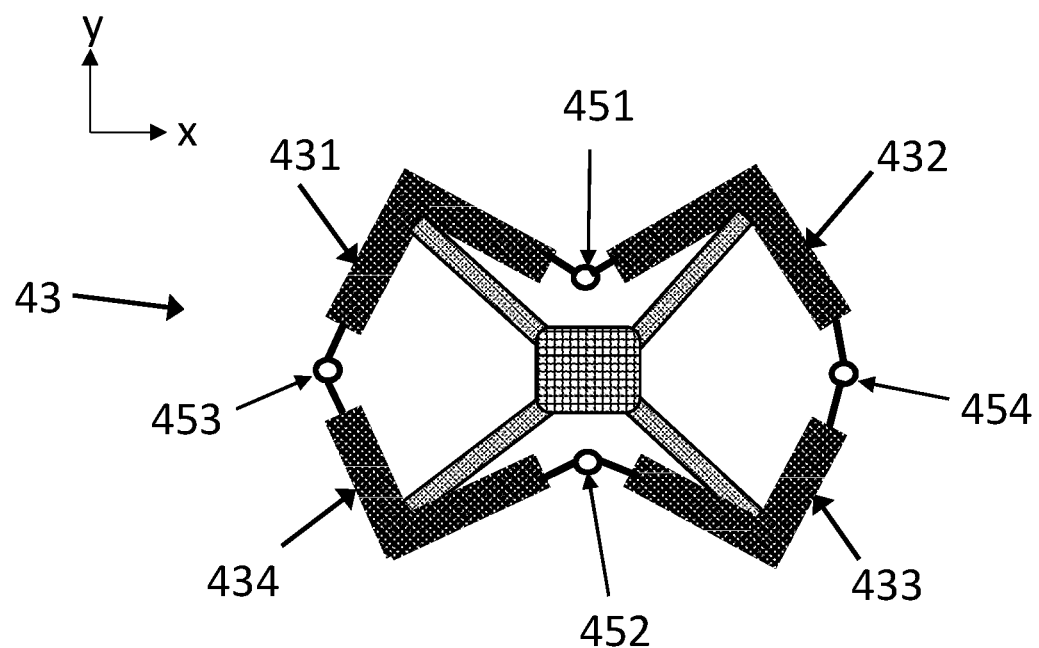

FIGS. 4a-4b illustrate the exemplary central synchronization element from the preceding Y-axis and XY-axis embodiments in more detail. Reference number 43 may correspond to either of the preceding reference numbers 131 or 35. The same synchronization element can be used either to synchronize the drive oscillation of two Coriolis element pairs on opposite sides of the synchronization element, as in the Y-axis embodiment above, or to synchronize the drive oscillation of four Coriolis element pairs located around the synchronization element as in the XY-axis embodiment above.

FIG. 4a illustrates the synchronization element in its rest position, which is also the position illustrated in the preceding figures. FIG. 4b illustrates the synchronization element in a part of the oscillation cycle where synchronization frames 161 and 162 or synchronization bars 361 and 362 have moved towards the central anchor point 445.

The synchronization element 43 comprises four corner elements 431-434. Each corner element may comprise a first bar and a second bar joined together in a relatively rigid manner. In the rest position of the synchronization element, each first bar may be oriented in the lateral direction and each second bar may be oriented in the transversal direction. Together, the corner elements may form an approximately square-shaped structure around the central anchor point 445, as illustrated in FIG. 4a.

Adjacent corner elements 431 and 432, 432 and 433, 433 and 434, and 434 and 431, may be joined to each other with corresponding hinge elements 451-454. These hinge elements allow the attached corner elements to rotate in opposite directions about the vertical axis which crosses the hinge element, as illustrated in FIG. 4b. Finally, the synchronization element 43 also comprises diagonal support bars 471-474 which attach the corner of each corner element 431-434 to the central anchor point 445.

In the XY-axis embodiment, the synchronization bars 361-364 may be attached to corresponding hinge elements 451-454. As illustrated in FIG. 4b, the simultaneous movement of synchronization bars 361 and 362 (and hinge element 451 and 452) towards the central anchor point 445 is accompanied by simultaneous movement of synchronization bars 363 and 364 (and hinge elements 453 and 454) away from the central anchor point 445.

The secondary oscillation modes of the first micromechanical resonator 11 is effectively decoupled from the secondary oscillation mode of the second micromechanical resonator 12 if the elements of the central synchronization element 43 are made sufficiently thick in the vertical direction. The central synchronization element will then not easily transmit out-of-plane movement from one resonator to the other due to the vertical stiffness of the hinge elements 451-454 and the other parts of the central synchronization element.

If the overall amplitude of the secondary mode in the first resonator 11 suddenly becomes smaller than the amplitude in the second resonator 12 (for example due to a mechanical fault in the suspension arrangement of the first micromechanical resonator), then the central synchronization element will not (to a significant extent) transmit this discrepancy to the second resonator 12. The first and second micromechanical resonators are independent in their secondary oscillation mode, so the first sense signal and the second sense signal will show different values and the mechanical fault can thereby be detected. Alternatively, as will be described in more detail below, the independence of the secondary modes of the first and second micromechanical resonators can be utilized for dedicating them to measure angular rotations of different magnitude.

Other central synchronization elements can also be used to transmit primary oscillation between opposing micromechanical resonators without transmitting a significant amount of secondary oscillation.

Z-Axis Embodiment

Drive oscillation modes can be coupled and sense oscillation modes decoupled also between adjacent z-axis gyroscopes (or, in the language of this disclosure, two adjacent z-axis sensing resonators). The z-axis is the input axis in this embodiment. In order to conduct robust measurements of angular rotation rate about the z-axis with both the first and the second micromechanical resonators, it is preferable to increase the number of Coriolis elements in both the first and the second micromechanical resonator to at least four. Even more Coriolis elements can optionally be added.

In this embodiment, the one or more first Coriolis element pairs comprise two first Coriolis element pairs, and the one or more second Coriolis element pairs comprise two second Coriolis element pairs. The two first Coriolis element pairs are aligned symmetrically around the first resonator center point and the two second Coriolis element pairs are aligned symmetrically around the second resonator center point.

The primary oscillation mode of the two first Coriolis element pairs comprises radial in-plane oscillation toward and away from the first resonator center point. The primary oscillation mode of the two second Coriolis element pairs comprises radial in-plane oscillation toward and away from the second resonator center point.

The coupling arrangement synchronizes a common anti-phase primary oscillation mode where the oscillation phase of the two first Coriolis element pairs with respect to the first resonator center point is anti-phase with the oscillation phase of the two second Coriolis element pairs with respect to the second resonator center point.

In this disclosure, "radial" oscillation refers to linear movement in the xy-plane, away from a central point and towards a central point. "Tangential" oscillation refers to movement in the xy-plane, along the tangent of an imaginary circle centered at a central point. Tangential movement can occur either in a clockwise or and anti-clockwise direction in relation to the central point. References to "clockwise" and "anti-clockwise" movement in this disclosure refer to the xy-plane as seen in the figures.

Figure 5A:
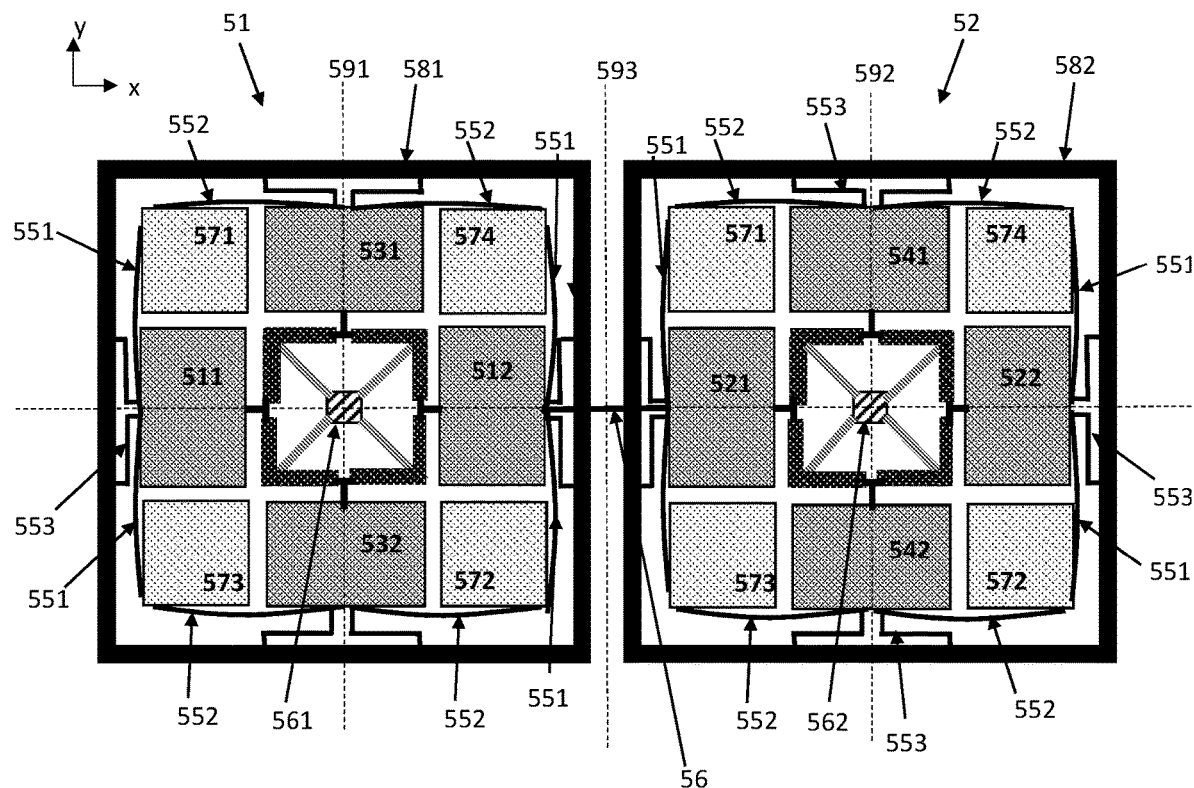
FIGS. 5a-5f illustrate z-axis gyroscopes with a common anti-phase primary oscillation mode.

FIG. 5a illustrates a z-axis gyroscope with a first micromechanical resonator 51 which comprises a first Coriolis element 511 and a second Coriolis element 512 which together form a first Coriolis element pair 511+512, and a second micromechanical resonator 52 which comprises a third Coriolis element 521 and a fourth Coriolis element 522 which together form a second Coriolis element pair 521+522. The first, second, third and fourth Coriolis elements are all symmetrically aligned on the lateral axis 58.

The first micromechanical resonator 51 also comprises a fifth Coriolis element 531 and a sixth Coriolis element 532. Together, these two Coriolis elements form another first Coriolis element pair 531+532. The fifth and sixth Coriolis elements are symmetrically aligned on a first transversal axis 591. Correspondingly, the second micromechanical resonator 52 also comprises a seventh Coriolis element 541 and an eighth Coriolis element 542 which form another second Coriolis element pair 541+542. The seventh and eighth Coriolis elements are symmetrically aligned on a second transversal axis 592.

The first resonator center point is located at the crossing point between the first transversal axis 591 and the lateral axis 58. The second resonator center point is located at the crossing point between the second transversal axis 592 and the lateral axis 58.

Each micromechanical resonator also comprises four optional corner masses 571-574 which are placed symmetrically around the respective resonator center point and aligned on diagonal axes which cross the respective center point at an angle of 45 degrees in relation to the lateral axis 58. Each corner mass 571-574 is connected to the adjacent Coriolis elements with one elongated transversal spring 551 and one elongated lateral spring 552, as illustrated in FIG. 5a. The elongated transversal and lateral spring transmit the tangential oscillation of the Coriolis elements to the corner masses 571-574, as will be described in more detail below.

The gyroscope comprises two central anchor points 561-562 located at the first and second resonator center points, respectively. The Coriolis elements may be suspended from the central anchor points 561-562 by any suitable suspension arrangement. The arrangement accommodates, and may also synchronize, the radial and tangential oscillation (described in more detail below) of the two Coriolis element pairs centered around each resonator center point. As illustrated in FIG. 5a, the suspension arrangement may, for example, have the same structure as the central synchronization element 43 which was illustrated in FIGS. 4a and 4b below. Each Coriolis element may be connected to a hinge element in the central suspension arrangement. The suspension arrangement may in this embodiment perform the same synchronization function which was described for central synchronization element 43 above.

The first Coriolis element pairs 511+512 and 531+532 in the first micromechanical resonator may be joined to each other by a first frame 581, and the second Coriolis element pairs 521+522 and 541+542 in the second micromechanical resonator may be joined to each other by a second frame 582, as illustrated in FIG. 5a. Each Coriolis element may be connected to the corresponding frame by frame springs 553 which allow radial and tangential oscillation with respect to the resonator center point. It may in some embodiments be advantageous to suspend the frames 581 and 582 from peripheral anchor points, so that they provide additional mechanical support for the Coriolis elements at the periphery. If the device in FIG. 5a is used as a multiaxis gyroscope, the frames 581 and 582 may also synchronize the out-plane-movements of the Coriolis element pairs in the x-axis and y-axis secondary oscillation modes. In this case, the x-axis and y-axis may be called measurement axes, while the z-axis is the input axis on which a double measurement is performed. If the device in FIG. 5a is used only as a z-axis gyroscope, and the Coriolis elements are sufficiently supported by the suspension arrangement around the central anchor points 561 and 562, then the frames 581 and 582 may not be needed at all.

The gyroscope comprises one or more drive transducers which have not been illustrated in FIG. 5a. These drive transducers may, for example, be capacitive transducers placed within an opening (not illustrated) around the central suspension arrangements around anchor points 561 and 562. A drive signal applied to the transducers can generate an oscillating force which sets the drive Coriolis elements in radial in oscillating motion, as described below. The one or more drive transducers may alternatively be piezoelectric transducers, and they may alternatively be placed somewhere outside of the first and second frames.

The gyroscope further comprises a coupling arrangement which includes drive synchronizing element 56 which joins the second Coriolis element 512 to the third Coriolis element 521. The drive synchronization element 56 is relatively stiff in the lateral direction, so that any radial movement in the second Coriolis element 512 is transmitted directly to the third Coriolis element 521, and vice versa. The drive synchronization element 56 is, however, flexible in the transversal direction, so that tangential movement is not transmitted from the second Coriolis element to the third, or vice versa. The drive synchronization element thereby flexibly allows any phase relationship in the secondary oscillation of the first and second resonators, even as it synchronizes their primary oscillation.

The primary oscillation mode of the Coriolis elements within each micromechanical resonator may be synchronized by the suspension arrangement which surrounds the corresponding resonator center point. The primary oscillation modes of the first and second electromechanical resonators is synchronized by the drive synchronization element 56.

The shapes of the Coriolis elements 511-542 and corner elements 571-574 illustrated in FIG. 5a are only examples. Other shapes can also be used.

The primary and secondary oscillation modes will now be described in more detail, utilizing white arrows to illustrate primary oscillation and black arrows to illustrate oscillation in the secondary oscillation mode induced by the Coriolis force when the gyroscope undergoes angular rotation about the z-axis. Two primary-secondary combinations are possible.

Figure 5B:
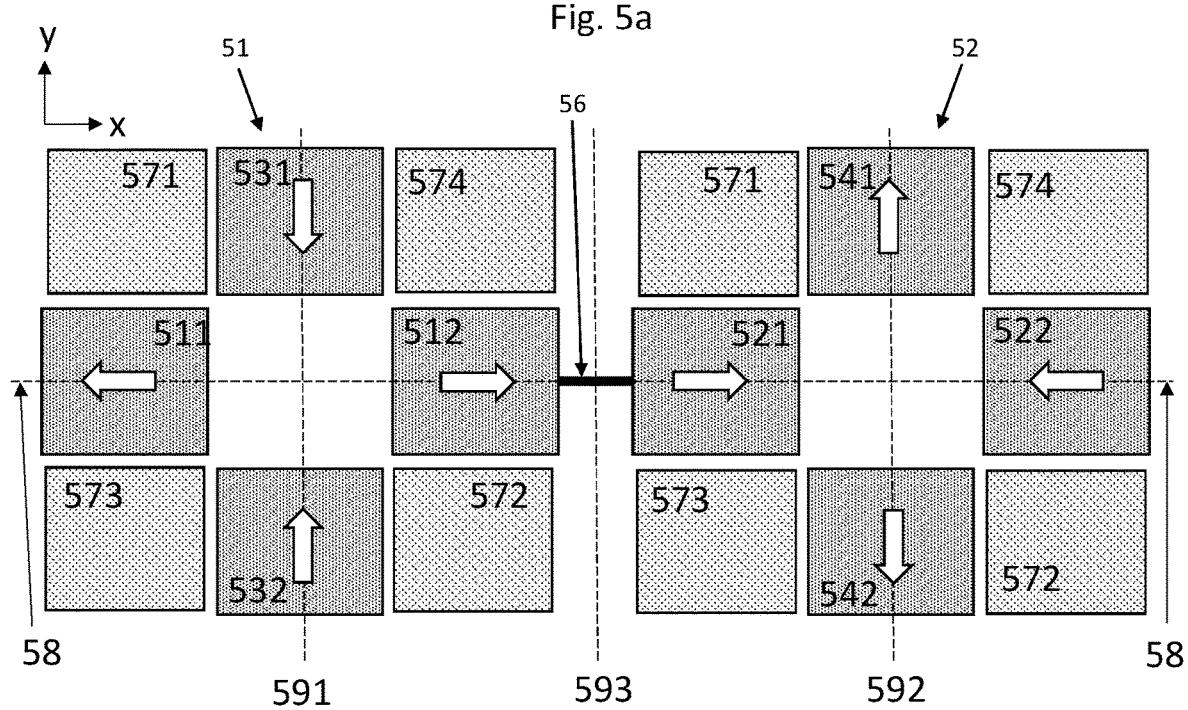

In the first combination, the one or more drive transducers are configured to set the Coriolis element pairs 511+512, 521+522, 531+532 and 541+542 into the primary oscillation mode which is illustrated with white arrows in FIG. 5b. As seen in the figure, the Coriolis element pair 511+512 moves radially away from the first resonator center point at the same time as the Coriolis element pair 531+532 moves radially toward the first resonator center point (and vice versa in the opposite half of the oscillation cycle, which is not illustrated).

The same phase relationship is obtained between the movement of the second Coriolis element pairs 521+522 and 541+542 in the second micromechanical resonator 52.

Furthermore, as illustrated in FIG. 5b, each first Coriolis element pair (511+512 or 531+532) moves away from the first resonator center point when the corresponding second Coriolis element pair (521+522 or 541+542, respectively) moves toward the second resonator center point (and vice versa in the opposite half of the oscillation cycle). In other words, the oscillation phase of the two first Coriolis element pairs (511+512 and 531+532) with respect to the first resonator center point is anti-phase with the oscillation phase of the two second Coriolis element pairs (521+522 and 541+542) with respect to the second resonator center point. A common anti-phase primary oscillation mode is thereby synchronized by the drive synchronization element 56.

In the primary oscillation mode, the first (511) and fourth (522) Coriolis elements oscillate along the lateral axis in the same phase (leftward in FIG. 5b), and the second and third Coriolis elements oscillate along the lateral axis in the same phase (rightward in FIG. 5b). Correspondingly, the first (511) and third (521) Coriolis elements oscillate along the lateral axis in anti-phase because the first Coriolis element 511 moves left when the third Coriolis element 521 moves right, and vice versa. Similarly, the second (512) and fourth (522) Coriolis element also oscillate along the lateral axis in anti-phase.

Due to the pair synchronization performed by the central suspension arrangement, the same phase relationships are obtained between the fifth to eighth Coriolis elements 531, 532, 541 and 542 as illustrated in FIG. 5b, although these Coriolis elements do not all oscillate along the same transversal axis.

Figure 5C:
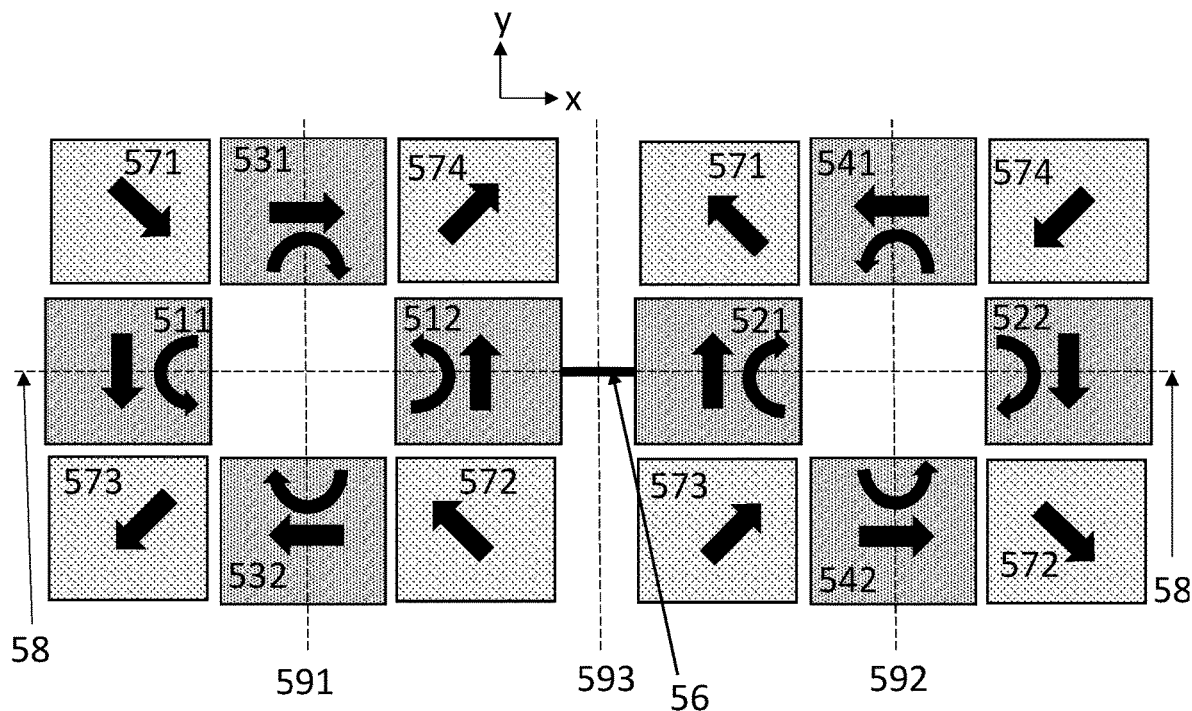

Corner masses 571-574 will not be actuated into translational oscillating motion by the primary oscillation of Coriolis element 511-542. FIG. 5c illustrates the secondary oscillation mode of both the Coriolis elements 511-542 and the corner masses 571-574 with black arrows. Each Coriolis element undergoes tangential oscillation due to the action of the Coriolis force.

The phase relationships between the tangential oscillations of the different Coriolis elements will be the same as their phase relationships in the primary mode. In the secondary mode, each corner mass 571-574 is actuated into translational oscillation along a diagonal axis because the secondary oscillation of the adjacent Coriolis elements is transmitted to each corner mass by the elongated transversal spring 551 and the elongated lateral spring 552 (illustrated in FIG. 5a).

The gyroscope comprises two or more first sense transducers for measuring the secondary oscillation in the first electromechanical resonator 51, and two or more second sense transducers for measuring the secondary oscillation in the second electromechanical resonator 52. The oscillation of the Coriolis elements can either be measured directly by connecting the sense transducers to the Coriolis elements, or indirectly by connecting the sense transducers to the corner masses 571-574.

In other words, the two or more first sense transducers may be connected to the first Coriolis element pairs, and the two or more second sense transducers may be connected to the second Coriolis element pairs. However, the tangential oscillation of the Coriolis elements pairs may often contain a rotational component, as illustrated in FIG. 5c. The magnitude of this rotational component with respect to the linear displacement will depend on how the Coriolis elements 511-542 are suspended for the translational deflection.

The first and second sense transducers may be connected to the corner masses 571-574 in each micromechanical resonator. The corner masses 571-574 can be suspended so that they undergo substantially linear translation along the diagonal direction in the secondary oscillation mode, which typically makes it easier to measure reliable first and second sense signals from their movement.

The sense transducers may, for example, comprise capacitive parallel plates fixed to the Coriolis elements or the corner mass and to an adjacent fixed structure. The two or more first sense transducers may be read through a differential amplifier to produce a first sense signal where the effect of undesired common-mode vibrations is at least partly cancelled. A second sense signal may be read from the two or more second sense transducers in the same manner.

Figure 5D:
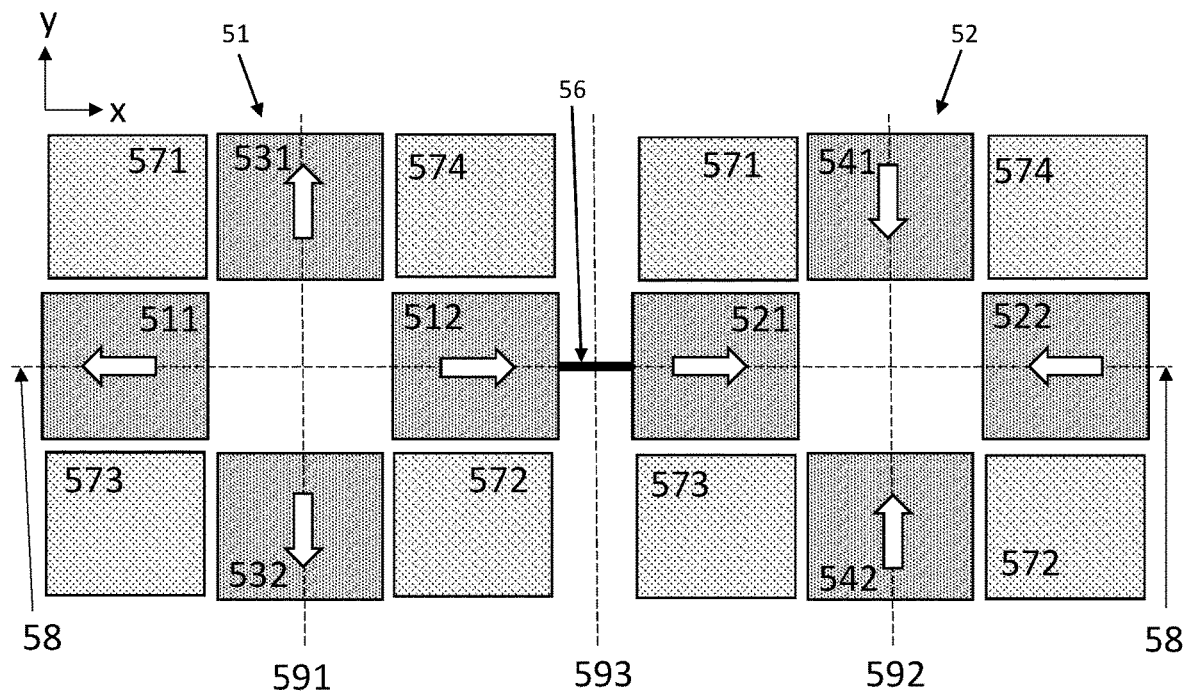
Figure 5E:
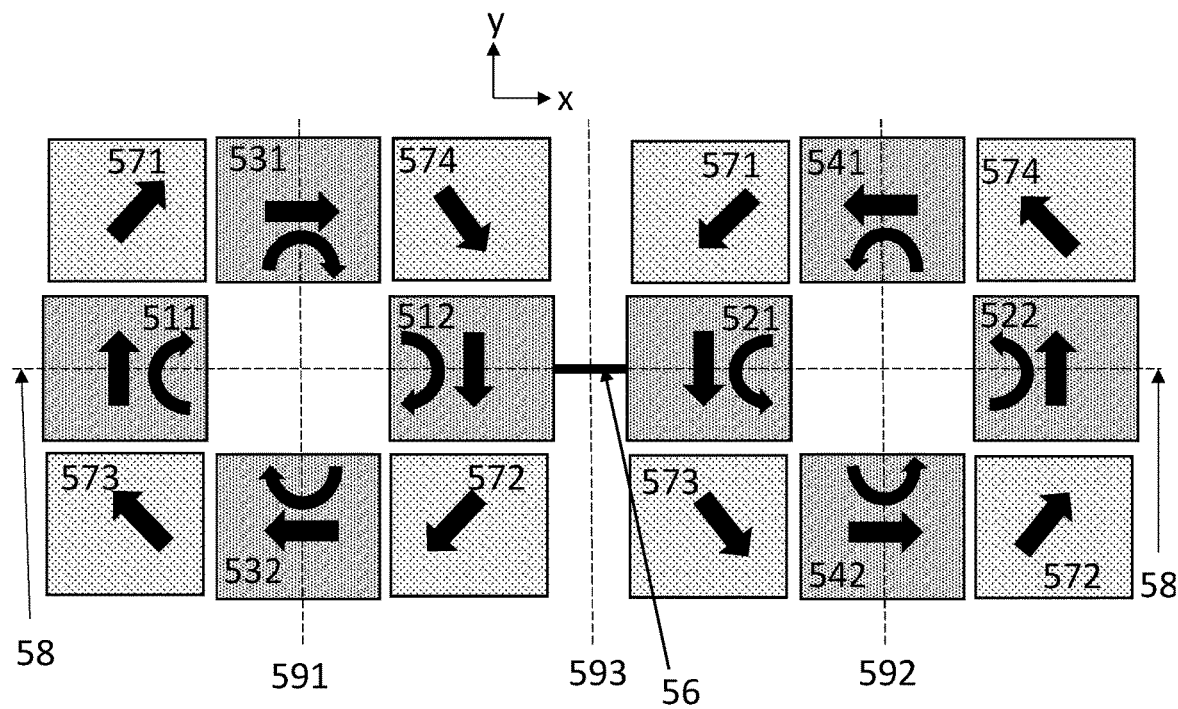

The combination of primary and secondary oscillation modes is illustrated in FIGS. 5d and 5e. The one or more drive transducers are now configured to set the Coriolis element pairs 511+512, 521+522, 531+532 and 541+542 into the primary oscillation mode which is illustrated with white arrows in FIG. 5d. As seen in the figure, the Coriolis element pair 511+512 moves radially away from the first resonator center point at the same time as the Coriolis element pair 531+532 also moves radially away from the first resonator center point (and vice versa in the opposite half of the oscillation cycle, which is not illustrated).

The same phase relationship is obtained between the movement of the second Coriolis element pairs 521+522 and 541+542 in the second micromechanical resonator 52.

Furthermore, each first Coriolis element pair (511+512 or 531+532) moves away from the first resonator center point when the corresponding second Coriolis element pair (521+522 or 541+542, respectively) moves toward the second resonator center point (and vice versa in the opposite half of the oscillation cycle). In other words, the oscillation phase of the two first Coriolis element pairs (511+512 and 531+532) with respect to the first resonator center point is again anti-phase with the oscillation phase of the two second Coriolis element pairs (521+522 and 541+542) with respect to the second resonator center point. A common anti-phase primary oscillation mode is thereby synchronized by the drive synchronization element 56.

Figure 5F:
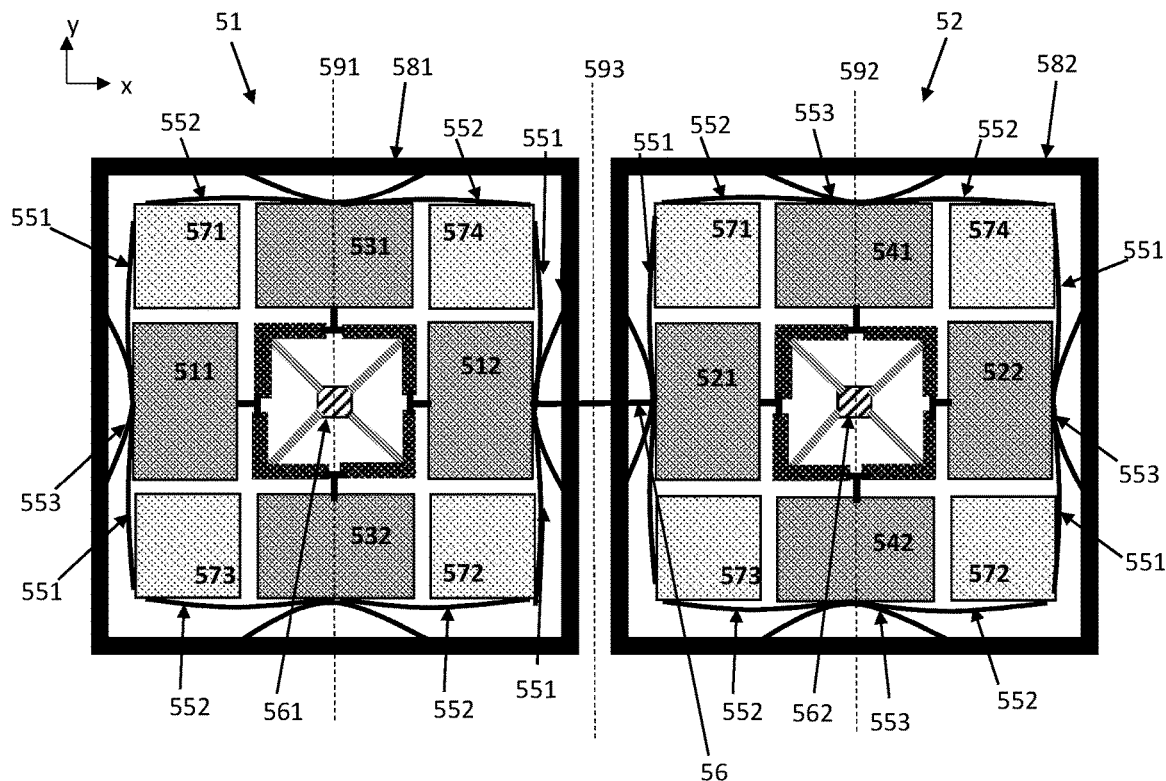

FIG. 5f illustrates the secondary oscillation modes of both the Coriolis elements 511-542 and the corner masses 571-574 with black arrows. Each Coriolis element and corner mass undergoes tangential oscillation due to the action of the Coriolis force.

In this oscillation mode, the frames 581 and 582 may synchronize the secondary oscillation modes of the first and second electromechanical resonators internally. That is, the first frame 581 may synchronize the secondary oscillation of the two first Coriolis elements pairs 511+512 and 531+523, while the second frame 582 may synchronize the secondary oscillation of the two second Coriolis element pairs 521+522 and 541+542. However, the secondary oscillation modes of the first and second electromechanical resonators are not synchronized with each other. In order to enhance the internal synchronization, each Coriolis element may be attached to the frame with a frame spring 553 which is radially flexible but tangentially inflexible, such as the frame springs 553 illustrated in FIG. 5f.

The drive synchronization element 56 and the first and second frames 581 and 582 may lie at different vertical heights, so that the drive synchronization element can move along the lateral axis 58. Alternatively, the lateral coupling spring and the first and second frames may lie in the same plane, and both the first and second frames 581 and 582 may be attached to the drive synchronization element 56 with flexible elements (not illustrated) at the point where they cross the drive synchronization element 56. These flexible elements allow the lateral spring 56 to oscillate along the lateral axis 58 while the first and second frames 581 and 582 remain stationary or rotate about their respective center points. However, the flexible should in that case be sufficiently flexible to avoid coupling of the secondary oscillation modes of the first and second electromechanical resonators via the drive synchronization element 56.

The secondary oscillation mode of the first micromechanical resonator 51 is then effectively decoupled from the secondary oscillation mode of the second micromechanical resonator 52 if the drive synchronization element 56, which forms the central synchronization element and couples the primary modes of the two resonators, is flexible for bending in the transversal direction. The spring constant of the drive synchronization element for bending in the lateral direction may, for example, be at least 5 times, or at least 10 times, or at least 15 times greater than its spring constant for bending in the transversal direction.

The first and second resonators thereby become independent of each other in the secondary mode, which allows the measurement of two independent sense signals from these two resonators. This independence can be utilized in different ways. For example, say that the overall amplitude of the secondary mode in the first resonator suddenly becomes smaller than the amplitude in the second resonator due to a mechanical fault in the suspension arrangement of the first micromechanical resonator. The amplitude of the tangential oscillation of Coriolis element 512 will then also be smaller than that of 521, since all Coriolis elements are strongly coupled to each other within each resonator. But the drive synchronization element 56 is flexible in the transversal direction and will not (to a significant extent) transmit this discrepancy from element 512 to element 521. The first sense signal and the second sense signal will show different values, so the discrepancy (and the mechanical fault) can be detected. Alternatively, as described in more detail below, the independence of the secondary modes of the first and second micromechanical resonators can be utilized to dedicate them to measure angular rotations in different measurement ranges.

Other arrangements for measuring z-axis angular rotation with two adjacent resonators that are coupled in their primary oscillation mode but independent in their secondary oscillation mode can also be utilized.

Measurement Embodiments

In all embodiments discussed above, the general principle behind the driving, coupling and suspension arrangements for the primary and secondary oscillation modes is that all Coriolis element pairs oscillate in anti-phase, so the first and second sense signals will be relatively free of vibration-induced interference. These signals can be read through the corresponding first and second differential amplifiers. Common-mode vibrations occurring within each Coriolis element pair are (at least to some degree) automatically cancelled in the first and second sense signals.

In other words, each of the first and second electromechanical resonators forms a partly robust rotation rate sensor on its own. Furthermore, in the primary oscillation mode the Coriolis element pair(s) in the first electromechanical resonator oscillates either in common anti-phase or common in-phase in relation to the Coriolis element pair in the second electromechanical resonator. When the gyroscope undergoes angular rotation, the Coriolis force will induce secondary oscillation modes in the first and second electromechanical resonators. The secondary oscillation mode of the first Coriolis element pair and the second Coriolis element pair will exhibit the same anti-phase or in-phase relationship oscillation.

It may be said that the first and second Coriolis element pairs measure angular rotation about the input axis in opposite directions when they oscillate in anti-phase. Any given rotation rate about the input axis will then give the first sense signal (measured from the first resonator) a certain positive magnitude and the second sense signal (measured from the second resonator) an approximately equal but negative magnitude (or vice versa). If the Coriolis elements in the first and second electromechanical resonators oscillate in-phase, a corresponding sign reversal can be generated electrically by coupling sense electrodes in the opposite order in the first and second sense transducers.

As described above, the secondary oscillation modes of the first and second electromechanical resonators are not mechanically coupled to each other by any direct link between these resonators. Instead, each resonator is preferably allowed to oscillate on its own, independently of the other. Minor indirect coupling of secondary oscillation modes may still occur through shared drive structures or coupling/suspension arrangements. However, this indirect coupling may be kept to a minimum with suitable device design.

When the first and the second electromechanical resonators are strongly coupled to a synchronized primary oscillation produced by a mutual drive mechanism or drive signal, but weakly or not at all coupled in their secondary oscillation modes, the two resonators function effectively as two adjacent, independent angular rotation rate sensors for the same input axis. Due to the shared drive mechanism or drive signal, the primary oscillation of the two resonators should always have the same amplitude and frequency. These features can be utilized to obtain at least two different benefits. The first relates to cancellation of error signals arising from common cause interference. The second relates to expansion of the measurement range. These applications will be discussed below.

Error in the sense signal can be caused by changes in the properties of a resonator due to e.g. mounting and packaging induced stress: either in the suspension of the Coriolis elements or sense structures or their coupling arrangements, or in the dimensions or symmetry of the accompanying transducers. Readout, control and signal processing electronics may also be a source of measurement errors in the sense signal. These errors may occur due to e.g. changes in temperature, humidity or some external mechanical force. The changes may alter the secondary oscillation of the electromechanical resonator, and thereby produce error in the sense signal.

Two adjacent electromechanical resonators manufactured very close to each other on the same substrate will often undergo nearly identical interference. It is therefore likely that a significant portion of their interference-related error will be equal.

The output of the first electromechanical resonator (in other words, a momentary value of the first sense signal) may be labelled $O_{1S}$, and the output of the second electromechanical resonator (a momentary value of the second sense signal) may be labelled $O_{2S}$. When the first and second sense signals are combined via differential amplification after appropriate signal processing and conditioning, like e.g. analog to digital conversion, demodulation, filtering and scaling, the corresponding momentary output in the rate signal will be $O_{RS}=O_{1S}-O_{2S}$.

When the first and second electromechanical resonators measure angular rotation about the input axis in opposite directions, their sense signals will have different signs and the output rate signal will be a difference of the two. However, the key benefit is that any error which occurs in the sense signal of the first electromechanical resonator (for example in a positive direction) is compensated by a corresponding error in the sense signal of the second electromechanical resonator (in a negative direction). Common error components of equal magnitude will cancel each other, whereas the differential rate signal will double, and the resulting rate signal will therefore have significantly reduced error components. In other words, any common deviation occurring in the sense signal of the first and second electromechanical resonators is automatically cancelled in the rate signal output.

In order to facilitate this cancellation, the amplitudes of the first and second sense signals should preferably be substantially equal. This can typically be achieved by making the first sense transducers and the second sense transducers substantially equal in their size and geometry. Furthermore, if some form of force feedback is implemented in the first and second electromechanical resonators, the gain of the force feedback in the first resonator should preferably be substantially equal to the gain of the force feedback in the second resonator. It is also possible to trim the gains of the two sense signals to equal level during sensor calibration.

To obtain the first benefit, the two or more first sense transducers are configured to produce a first sense signal with an amplitude which is substantially equal to the amplitude of the second sense signal produced by the two or more second sense transducers, and that the first sense signal is produced by reading the output of the two or more first sense transducers through a first differential amplifier, and that the second sense signal is produced by reading the output of the two or more second sense transducers through a second differential amplifier, and that the gain of the first differential amplifier is substantially equal to the gain of the second differential amplifier, and that the readout circuit comprises a main differential amplifier which takes the first sense signal and the second sense signal as its input, and the readout circuit is configured to read a rate signal from the main differential amplifier.

Figure 6:
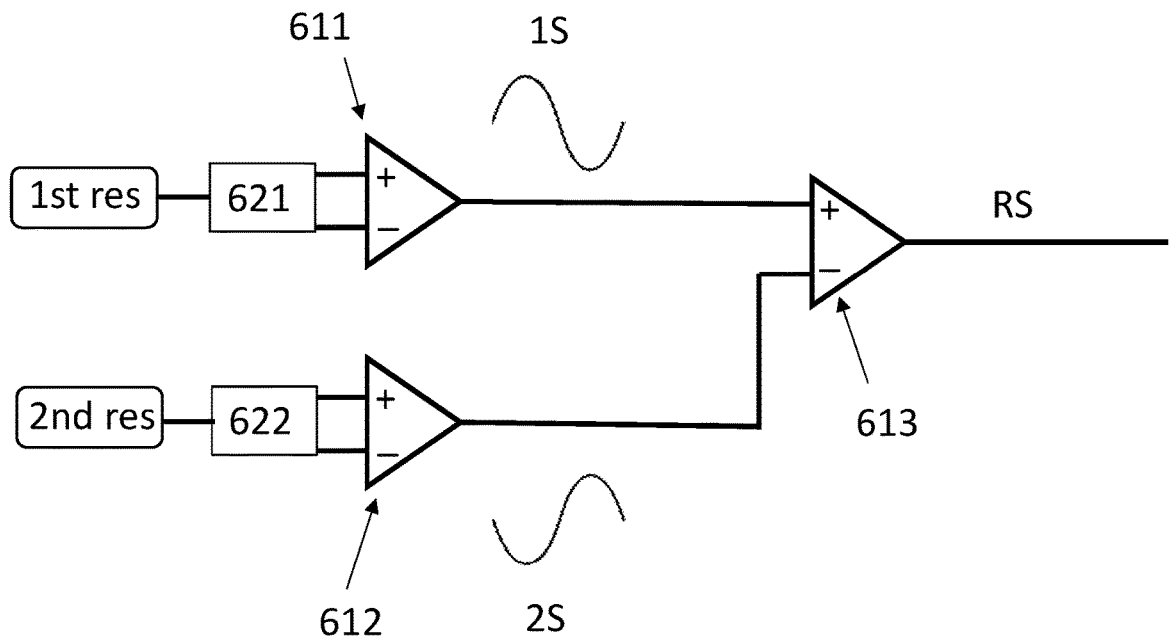
FIGS. 6-8 illustrate readout circuits.

FIG. 6 illustrates a readout circuit with a first differential amplifier 611 configured to read a first sense signal 1S from one or more first sense transducers 621, and a second differential amplifier 612 configured to read a second sense signal 2S from one or more second sense transducers 622.

The first sense transducers 621 are configured to produce a voltage or current output proportional to the sense oscillation of the first electromechanical resonator, while the second sense transducers 622 are configured to produce a voltage or current output proportional to the sense oscillation of the second electromechanical resonator. In each resonator, the voltage or current output is a combination of outputs from one or more Coriolis element pairs, wherein each Coriolis element pair comprises elements that oscillate in anti-phase.

The readout circuit also comprises a main differential amplifier 613 which produces a rate signal RS from the differentially combined first and second sense signals 1S and 2S. Preferably this is conducted after demodulating the two Coriolis signals, i.e. the first and second sense signals, into baseband.

It is also possible to implement a self-test function by summing the output of the first and second electromechanical resonators. In the notation introduced above, a self-test output $O_{ST}$ can be calculated as $O_{1S}+O_{2S}$. As before, the two outputs $O_{1S}$ and $O_{2S}$ may have different signs. As long as both the first and the second electromechanical resonators are working properly (and no common drift is taking place), the self-test output should equal zero. If the output of one electromechanical resonator deviates from that of the other to an extent which exceeds a predetermined self-test limit, the control circuit may output a self-test error signal to indicate a potential problem.

The readout circuit may comprise a summing self-test circuit which takes as its input the first sense signal and the second sense signal, and the readout circuit may be configured to read a self-test signal from the self-test circuit. The control circuit may be configured to output an error signal if the self-test signal exceeds a predetermined self-test threshold value. As above, the first sense signal is produced by reading the output of the two or more first sense transducers through a first differential amplifier, and the second sense signal is produced by reading the output of the two or more second sense transducers through a second differential amplifier.

Figure 7:
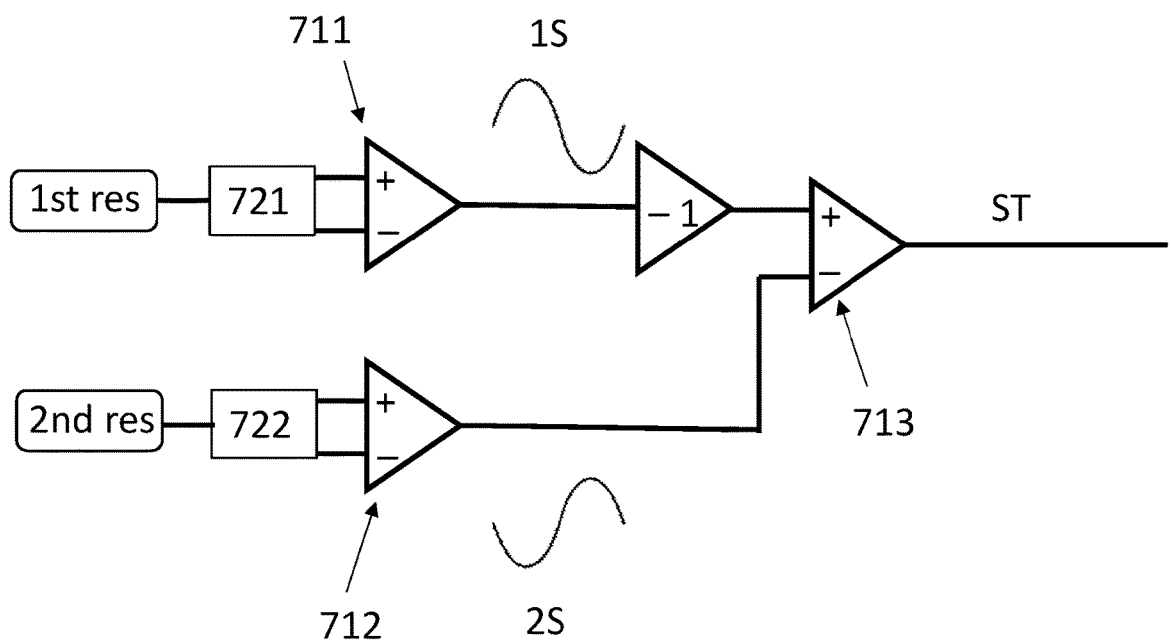

FIG. 7 illustrates a simple self-test readout circuit where reference numbers 711-712 and 721-722 correspond to reference numbers 611-612 and 621-622 in FIG. 6, respectively. The self-test signal is produced by inverting one of the two sense signals and reading them through a self-test differential amplifier 713.

The self-test readout circuit illustrated in FIG. 7 may be implemented in combination with the main readout circuit illustrated in FIG. 6. Knowing that common drifts will be cancelled in the main sense signal, the self-test limits or threshold values may be suitably selected so that no error signal is produced when tolerably small amounts of drift occur in the first and second sense signals 1S and 2S.

In order to achieve the second benefit, expansion of the measurement range, the two or more first sense transducers may be configured to produce a first sense signal which has substantially larger amplitude than the second sense signal produced by the two or more second sense transducers. The gain of the first differential amplifier should be larger than the gain of the second differential amplifier. In this case the control unit may be configured to store or monitor the first sense signal and the second sense signal separately.

The first and second sense transducers may for example be configured to produce first and second sense signals with significantly different amplitudes by designing their size or geometry to be significantly different. Alternatively, if force feedback is implemented in the first and second resonators, the gain of the force feedback of the first resonator may be significantly different from the gain of the force feedback of the second resonator.

When the amplitude of the first sense signal is substantially larger than the amplitude of the second sense signal, and the gains of the corresponding amplifiers are selected in the manner described above, the first and second electromechanical resonators may be used for two different kinds of measurements. The output of the first electromechanical resonator will cover a broader range than the output of the second electromechanical resonator, but it will also be more noisy.

The first sense signal may, for example, be adapted to cover the most common range of angular rotation values which the gyroscope is designed to measure. The second sense signal may then be adapted to cover a range of small angular rotation values, in other words angular rotations close to zero, with high accuracy. Alternatively, the second sense signal may be adapted to cover the most common range, and the first sense signal may be adapted to cover a much broader range which includes exceptionally large angular rotation values. In either case, values in the common range can be measured with good accuracy through one electromechanical resonator, and values which fall close to one end of this range or beyond this range can be measured with good accuracy through the other electromechanical resonator.

Figure 8:
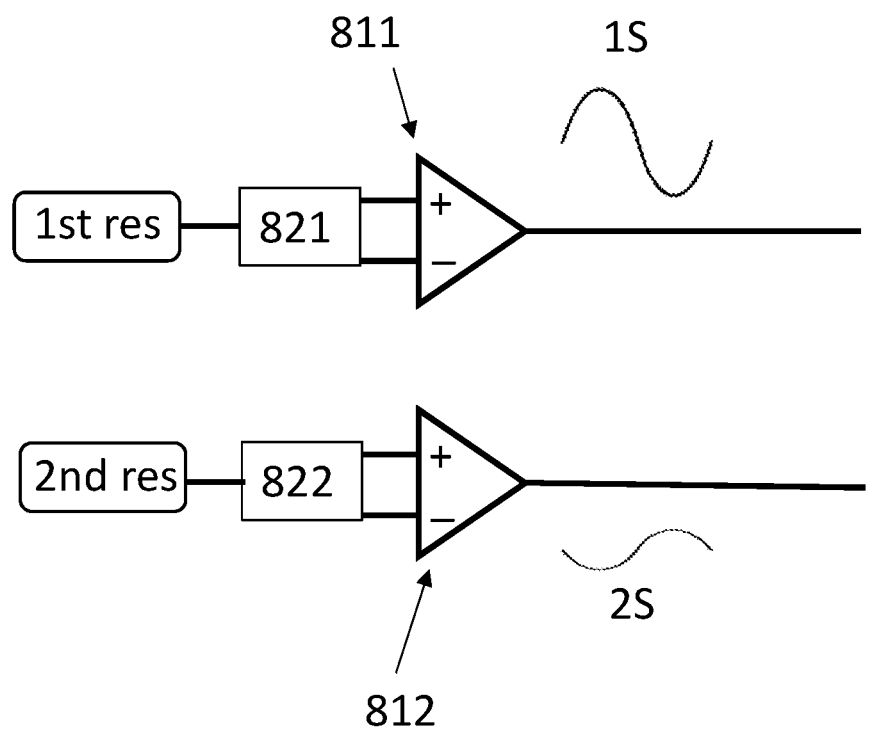

FIG. 8 illustrates a readout circuit with a first differential amplifier 811 configured to read a first sense signal 1S from one or more first sense transducers 821, and a second differential amplifier 812 configured to read a second sense signal 2S from one or more second sense transducers 822.

The first and second sense transducers 821 and 822 perform the same function as sense transducers 621 and 622 in FIG. 6, but their gains are different. The voltage or current produced by the sense transducers 821 and 822 thereby also differ from each other. The first sense signal 1S obtains an amplitude which is substantially larger than the amplitude of the second sense signal 2S, even though they both provide a measure of the same angular rotation. As in FIG. 6, the voltage or current output of the first and second sense transducers 821 and 822 is a combination of outputs from one or more Coriolis element pairs. Each Coriolis element pair comprises elements that oscillate in anti-phase.

In other words, the first sense signal may be produced by reading the output of the two or more first sense transducers through a first differential amplifier, and the second sense signal may be produced by reading the output of the two or more second sense transducers through a second differential amplifier. Two or more first sense transducers may be configured to produce a first sense signal which has a substantially larger amplitude than the second sense signal produced by two or more second sense transducers. The gain of the first differential amplifier may be larger than the gain of the second differential amplifier, and the control unit may be configured to store or monitor the first sense signal and the second sense signal separately.

Compared to a situation where two completely separate gyroscopes would be fixed to the same circuit board for measuring different ranges of angular rotation, the arrangement described above costs significantly less, requiring only one package, one integrated electronics sharing lots of common blocks, like e.g. drive functionality between the measurements and one integrated sensing element. The arrangement is also more robust, since the two Coriolis-element are manufactured next to each other. They are also much more similar, which simplifies calibration.

It may in some gyroscopes be possible to connect more than two resonators to the same drive mechanism or drive signal, and to conduct more than two measurements of angular rotation about a given input axis, or to divide the measurement range into more than two separately measured ranges.

A self-test readout circuit, such as the one illustrated in FIG. 7, can be implemented also in combination with the main readout circuit illustrated in FIG. 8. However, since the amplitudes of the first and second sense signals 1S and 2S will in this case be unequal, the expected value of the self-test output signal when both resonators are working properly may generally not be zero. However, preferably the gain of the two signals for the self-test functionality should be inverse in proportion compared to the signal gains, and in that case their sum will be ideally equal to zero. It is also possible to combine the main readout circuit in FIG. 8 with two different self-test readout circuits, one for sense signal 1S and another for sense signal 2S.

The invention claimed is:

1. A microelectromechanical gyroscope comprising:
a device plane defined by a lateral axis and a transversal axis, wherein the transversal axis is orthogonal to the lateral axis, and wherein the gyroscope also comprises at least one input axis which is either parallel to the lateral axis, parallel to the transversal axis, or orthogonal to the device plane,
and the gyroscope further comprises a first electromechanical resonator and a second electromechanical resonator with a corresponding first resonator center point and second resonator center point,
and the first electromechanical resonator comprises one or more first Coriolis element pairs, wherein each first Coriolis element pair is arranged symmetrically in relation to the first resonator center point, and the second electromechanical resonator comprises the same number of second Coriolis element pairs, wherein each second Coriolis element pair is arranged symmetrically in relation to the second resonator center point,
and the size, shape and location of each of the one or more first Coriolis element pairs in relation to the first resonator center point are substantially equal to the size, shape, and location of the corresponding second Coriolis element pair in relation to the second resonator center point,
and the gyroscope further comprises a control unit and one or more drive transducers, and the control unit comprises a drive circuit which is configured to set the first and second electromechanical resonators into their respective primary oscillation modes by applying one or more drive signals to the one or more drive transducers, whereby in the primary oscillation mode the one or more first Coriolis element pairs oscillate in anti-phase in relation to the first resonator center point and the one or more second Coriolis element pairs oscillate in anti-phase in relation to the second resonator center point,
and the gyroscope further comprises two or more first sense transducers connected to the first electromechanical resonator and configured to produce a first sense signal from a secondary oscillation mode induced in the first electromechanical resonator by the Coriolis force when the gyroscope undergoes angular rotation about the input axis, and the gyroscope further comprises two or more second sense transducers connected to the second electromechanical resonator and configured to produce a second sense signal from a secondary oscillation mode induced in the second electromechanical resonator by the Coriolis force when the gyroscope undergoes angular rotation about the input axis,
and all first and second Coriolis element pairs are suspended from a fixed structure by at least partly flexible suspension arrangements which accommodate the primary oscillation mode of the first and second electromechanical resonators, the secondary oscillation mode induced in the first electromechanical resonator and the secondary oscillation mode induced in the second electromechanical resonator,
wherein the first and second electromechanical resonators are mechanically coupled with a coupling arrangement which synchronizes the primary oscillation modes of the first and second electromechanical resonators into a common in-phase or anti-phase primary oscillation mode but does not synchronize the secondary oscillation modes of the first and second electromechanical resonators.

2. The microelectromechanical gyroscope according to claim 1,
wherein the two or more first sense transducers are configured to produce the first sense signal with an amplitude which is substantially equal to the amplitude of the second sense signal produced by the two or more second sense transducers, and that the first sense signal is produced by reading the output of the two or more first sense transducers through a first differential amplifier, and that the second sense signal is produced by reading the output of the two or more second sense transducers through a second differential amplifier, and that the gain of the first differential amplifier is substantially equal to the gain of the second differential amplifier, and that the readout circuit comprises a main differential amplifier which takes the first sense signal and the second sense signal as its input, and the readout circuit is configured to read a rate signal from the main differential amplifier.

3. The microelectromechanical gyroscope according to claim 1,
wherein the first sense signal is produced by reading the output of the two or more first sense transducers through a first differential amplifier, and the second sense signal is produced by reading the output of the two or more second sense transducers through a second differential amplifier, and that the two or more first sense transducers are configured to produce a first sense signal which has a substantially larger amplitude than the second sense signal produced by the two or more second sense transducers, and the gain of the first differential amplifier is larger than the gain of the second differential amplifier, and the control unit is configured to store or monitor the first sense signal and the second sense signal separately.

4. The microelectromechanical gyroscope according to claim 1,
wherein the first sense signal is produced by reading the output of the two or more first sense transducers through a first differential amplifier, and the second sense signal is produced by reading the output of the two or more second sense transducers through a second differential amplifier, and the readout circuit comprises a summing self-test circuit which takes as its input the first sense signal and the second sense signal, and the readout circuit is configured to read a self-test signal from the self-test circuit, and the control circuit is configured to output an error signal if the self-test signal exceeds a predetermined self-test threshold value.

5. The microelectromechanical gyroscope according to claim 1,
wherein the one or more first Coriolis element pairs comprise one first Coriolis element pair, and the one or more second Coriolis element pairs comprise one second Coriolis element pair, and the primary oscillation mode of the first and second electromechanical resonators comprises rotational in-plane oscillation of each Coriolis element about a vertical axis which crosses said Coriolis element, and the coupling arrangement synchronizes a common anti-phase primary oscillation mode where the oscillation phase of the first Coriolis element pair with respect to the first resonator center point is anti-phase in relation to the oscillation phase of the second Coriolis element pair with respect to the second resonator center point.

6. The microelectromechanical gyroscope according to claim 1,
wherein the one or more first Coriolis element pairs comprise one first Coriolis element pair, and the one or more second Coriolis element pairs comprise one second Coriolis element pair, and the primary oscillation mode of the first and second electromechanical resonators comprises rotational in-plane oscillation of each Coriolis element about a vertical axis which crosses said Coriolis element, and the coupling arrangement synchronizes a common in-phase primary oscillation mode where the oscillation phase of the first Coriolis element pair with respect to the first resonator center point is in-phase with the oscillation phase of the second Coriolis element pair with respect to the second resonator center point.

7. The microelectromechanical gyroscope according to claim 1,
wherein the one or more first Coriolis element pairs comprise two first Coriolis element pairs, and the one or more second Coriolis element pairs comprise two second Coriolis element pairs, wherein the two first Coriolis element pairs are aligned symmetrically around the first resonator center point and the two second Coriolis element pairs are aligned symmetrically around the second resonator center point,
and the primary oscillation mode of the two first Coriolis element pairs comprises radial in-plane oscillation toward and away from the first resonator center point, and the primary oscillation mode of the two second Coriolis element pairs comprises radial in-plane oscillation toward and away from the second resonator center point, and the coupling arrangement synchronizes a common anti-phase primary oscillation mode where the oscillation phase of the two first Coriolis element pairs with respect to the first resonator center point is anti-phase with the oscillation phase of the two second Coriolis element pairs with respect to the second resonator center point.

8. The microelectromechanical gyroscope according to claim 7, wherein the secondary oscillation mode of the two first Coriolis element pairs is internally synchronized by a first central synchronization element centred at the first resonator center point, and the secondary oscillation mode of the two second Coriolis element pairs is internally synchronized by a second central synchronization element centred at the second resonator center point.

* * * * *